(12) United States Patent
Svensson

(10) Patent No.: US 6,571,717 B2
(45) Date of Patent: Jun. 3, 2003

(54) Y-SHAPED SUPPORT STRUCTURE FOR ELEVATED RAIL-VEHICLE GUIDEWAY

(76) Inventor: Einar Svensson, 19686 Sunshine Way, Bend, OR (US) 97702

( * ) Notice: Subject to any disclaimer, the term of this patent is extended or adjusted under 35 U.S.C. 154(b) by 0 days.

(21) Appl. No.: 09/925,959

(22) Filed: Aug. 9, 2001

(65) Prior Publication Data

US 2002/0073876 A1 Jun. 20, 2002

Related U.S. Application Data

(63) Continuation-in-part of application No. 09/673,033, filed as application No. PCT/US99/07659 on Apr. 8, 1999
(60) Provisional application No. 60/127,818, filed on Apr. 5, 1999, provisional application No. 60/107,485, filed on Nov. 6, 1998, and provisional application No. 60/081,337, filed on Apr. 8, 1998.

(51) Int. Cl.[7] .................................. B61B 5/00
(52) U.S. Cl. .................................... 104/125
(58) Field of Search .................... 104/124, 125, 104/118, 119, 120, 121; 105/141, 144, 145, 146, 147; 52/174; 14/75, 77.3

(56) References Cited

U.S. PATENT DOCUMENTS

| 1,305,415 A | | 6/1919 | Steffens | |
|---|---|---|---|---|
| 1,600,767 A | | 9/1926 | Lockwood | |
| 2,630,075 A | * | 3/1953 | Omsted | 104/125 |
| 3,225,703 A | * | 12/1965 | Lemcke | 104/120 |
| 3,353,498 A | * | 11/1967 | Davis | 104/118 |
| 3,426,703 A | | 2/1969 | Morris | |
| 3,477,080 A | | 11/1969 | Finsterwalder et al. | |
| 3,710,727 A | | 1/1973 | Svensson | |
| 4,042,308 A | | 8/1977 | Freedman | |
| 4,274,336 A | | 6/1981 | Pater et al. | |
| 4,313,383 A | | 2/1982 | Parazader | |
| 4,382,412 A | | 5/1983 | Sullivan | |
| 4,665,830 A | | 5/1987 | Anderson et al. | |
| 5,386,782 A | | 2/1995 | Dinis et al. | |
| 5,511,488 A | | 4/1996 | Powell et al. | |
| 5,651,318 A | | 7/1997 | O'Donohue | |
| 5,845,581 A | | 12/1998 | Svensson | |
| 6,182,576 B1 | | 2/2001 | Svensson | |

FOREIGN PATENT DOCUMENTS

| CA | 550219 | 12/1957 |
|---|---|---|
| DE | 33 35 058 | 4/1985 |
| GB | 2209318 | 5/1989 |

OTHER PUBLICATIONS

Disney World Monorail, Florida, USA, Dual Guideway (Same Technology as Seattle Monorail) no date.

* cited by examiner

Primary Examiner—Mark T. Le
(74) Attorney, Agent, or Firm—Klarquist Sparkman, LLP

(57) ABSTRACT

The invention is a support structure for a railed-vehicle that includes individual, unassembled components sized for easy transport. In one embodiment, the support structure includes curved columns integrally-formed with a base, the columns imparting a curved, Y-shaped configuration to the support structure. The components may be prefabricated with known materials and methods and transported to an installation site for assembly. The support structure is preferably sized to support one or two vehicle guideways. The support structure may include a pile foundation for improved support during seismic activity and to facilitate installation on existing streets and sidewalks without covering or interfering with underground plumbing or utilities. Preferably, multiple sections of the guideway are rigidly secured together through expansion joints to define a continuous guideway such that loads on the guideway are distributed over multiple columns.

28 Claims, 22 Drawing Sheets

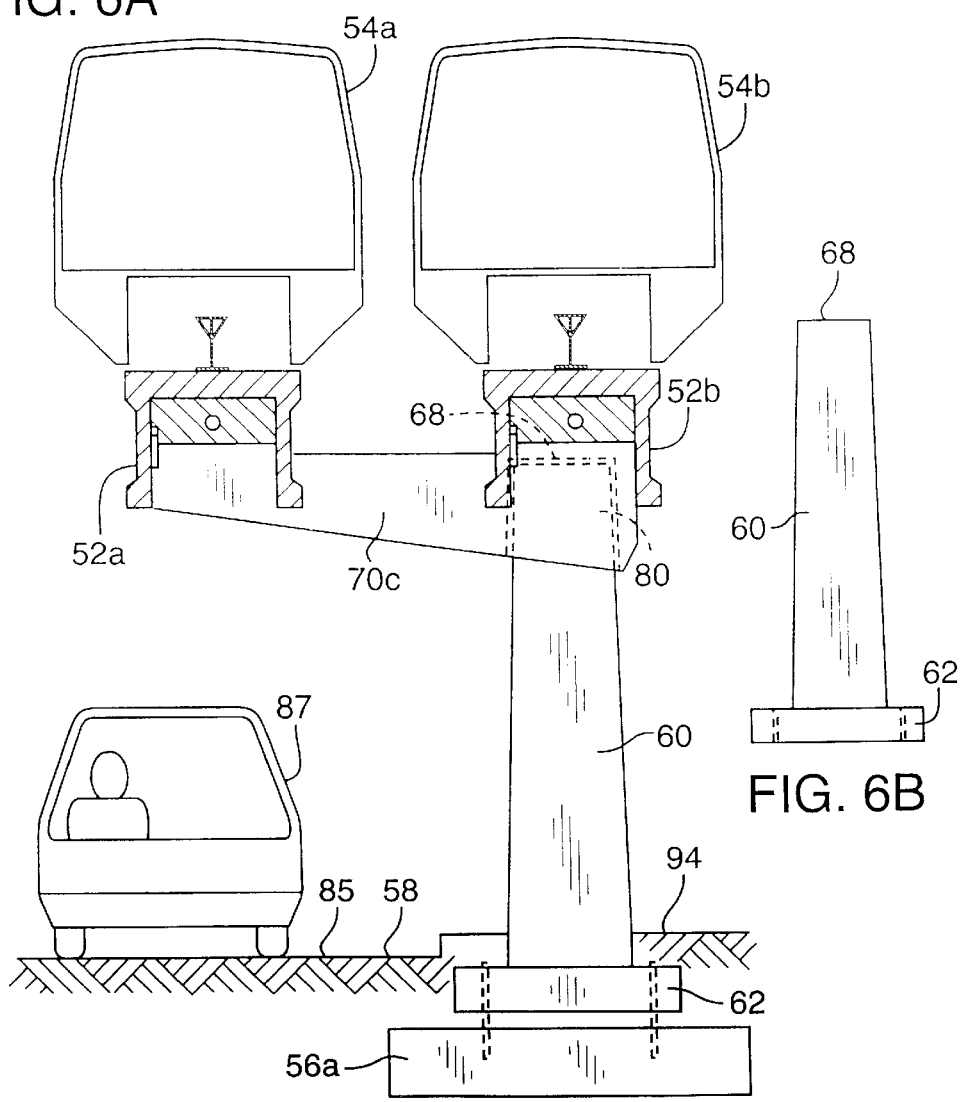

FIG. 12A  FIG. 12B  FIG. 12C
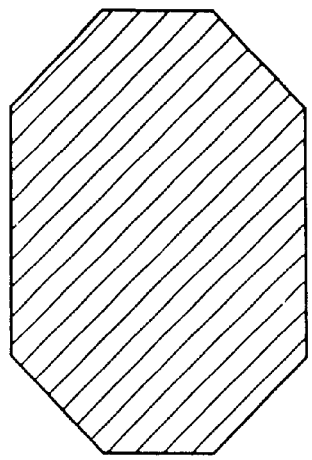 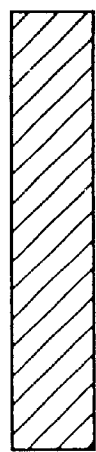 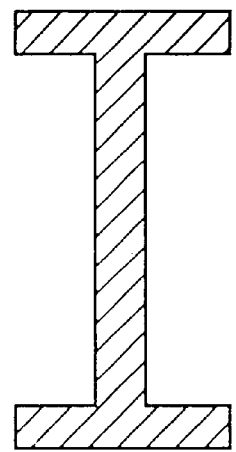
FIG. 12D  FIG. 12E
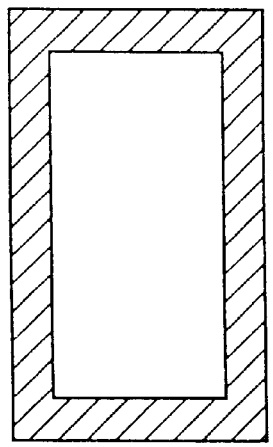 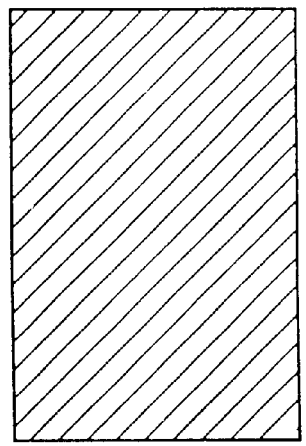

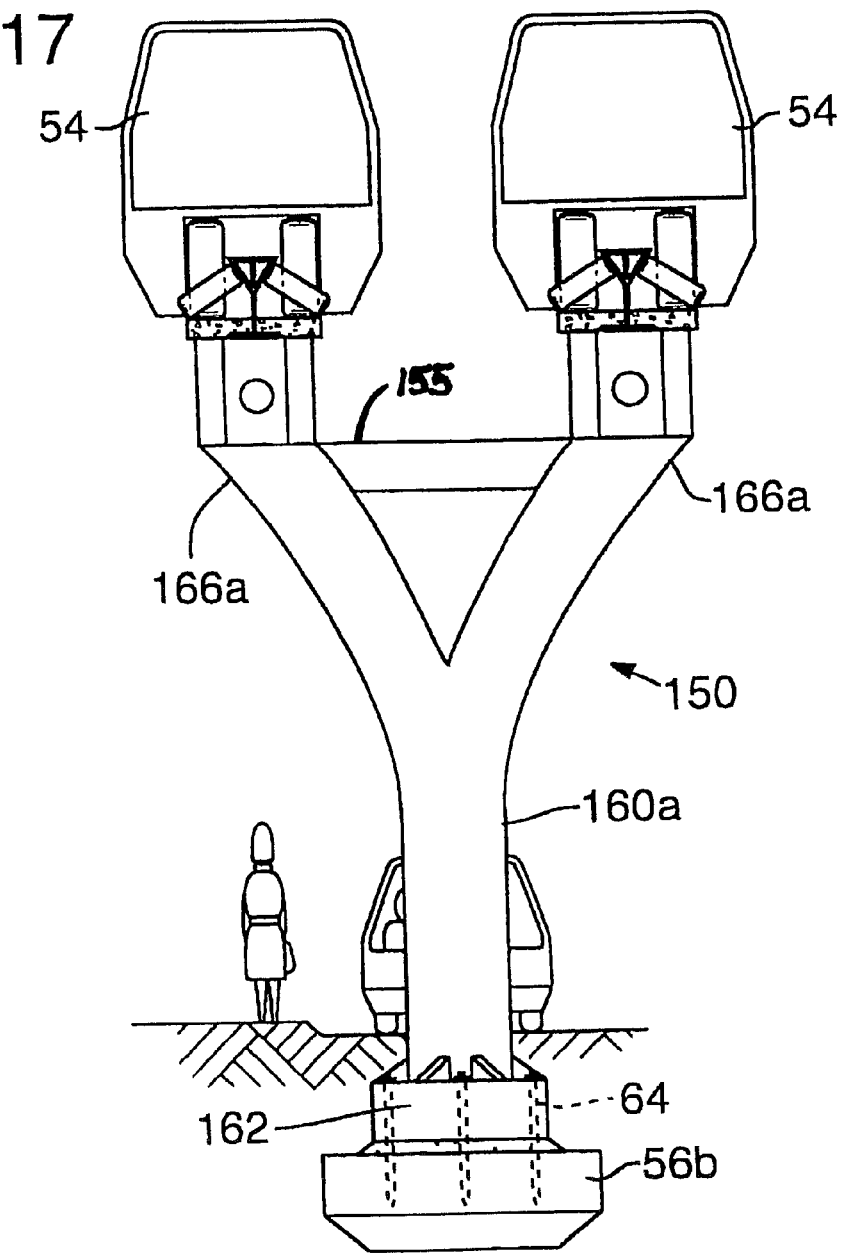

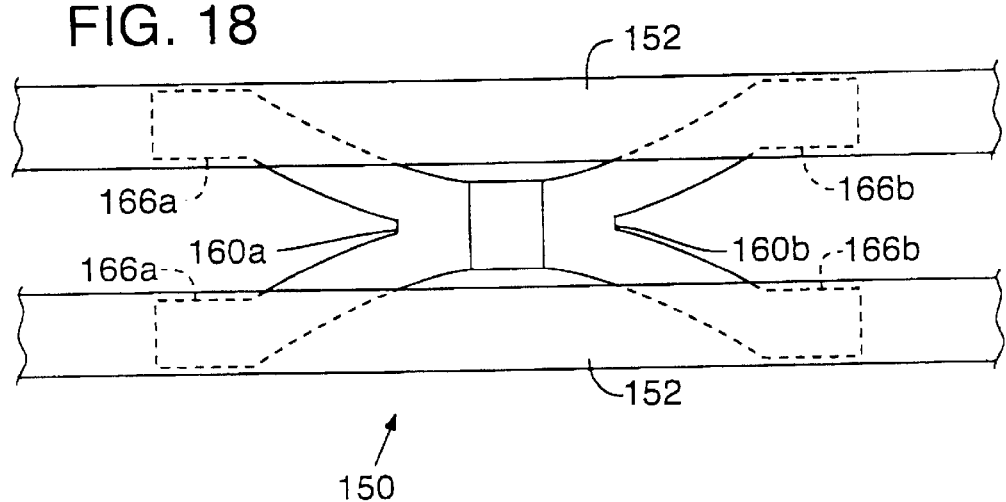
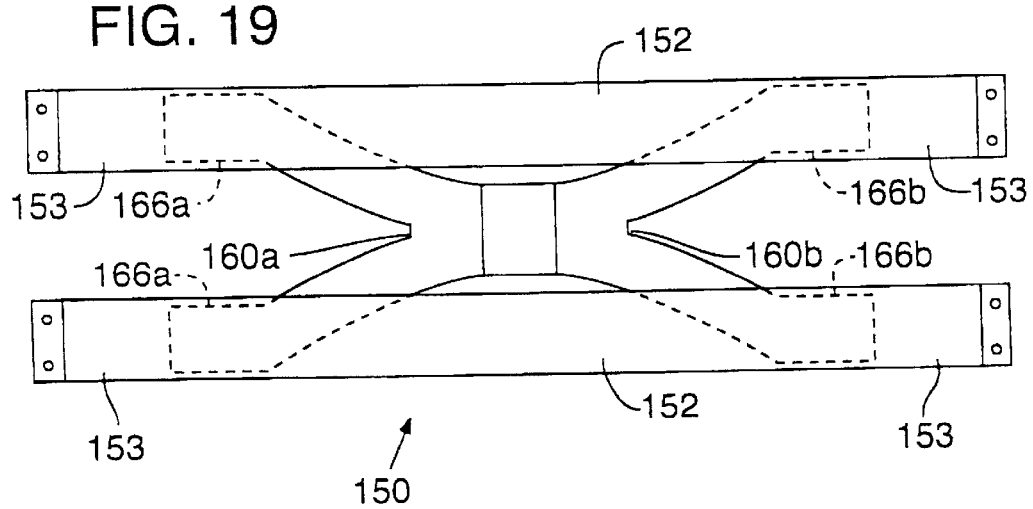

Y-SHAPED SUPPORT STRUCTURE FOR ELEVATED RAIL-VEHICLE GUIDEWAY

This application is a continuation-in-part application of U.S. application Ser. No. 09/673,033, filed Dec. 6, 2000, which is a 371 of PCT/US 99/07659, filed Apr. 8, 1999, which claims the benefit of U.S. Provisional Application No. 60/081,337, filed on Apr. 8, 1998; U.S. Provisional Application No. 60/107,485, filed on Nov. 6, 1998; and U.S. Provisional Application No. 60/127,818, filed on Apr. 5, 1999.

BACKGROUND OF THE INVENTION

1. Field of the Invention

The present invention relates to a support structure for an elevated railed-vehicle, such as a monorail. The invention concerns, more particularly, an elevated monorail support structure constructed of prefabricated components that may be easily transported to an installation site and assembled together at the installation site. The support structure preferably includes a pile foundation for improved support during seismic activity and to facilitate installation on existing streets and sidewalks without covering or interfering with underground plumbing or utilities.

2. Description of Background Art

Elevated railed-vehicle systems, such as monorail systems, have numerous benefits, particularly in overcrowded urban environments where the surface streets are congested with traffic and traditional forms of mass transportation, such as buses, must compete for space with existing traffic. For example, a dedicated elevated guideway vehicle system operates above city streets and therefore is immune from traffic congestion. It provides a quick and convenient way for moving people around a city, and it actually helps to relieve traffic congestion.

However, existing elevated railed-vehicle systems have several characteristics that preclude their acceptance throughout the world. First, known support structures are heavy and excessively large making them expensive to construct and install. Such structures are difficult to prefabricate at a central manufacturing facility and then transport easily to the location where they will ultimately be installed. Accordingly, the support structures must be individually manufactured on the site where they will be used. The time and expense of manufacturing such structures is a primary contributor to the excessive costs of elevated rail systems. In addition, variations in weather, temperature, and environment at each individual support structure manufacturing site combined with variations associated with continuously having to move and set-up the manufacturing equipment at each site make it difficult to efficiently control the quality and consistency of each manufactured support structure.

Also, because of space limitations in urban environments, it is desirable to position elevated railed-vehicle systems over existing surface streets. However, in such cases, it is difficult to position known support structures for supporting the guideway so as to not interfere with at least one vehicle traffic lane below the guideway. One way to avoid disrupting street traffic is to position such support structures adjacent to existing roads, such as on sidewalks, instead of on the road itself. Such positioning prevents the support structures from blocking at least one lane of traffic.

However, placement of known support structures adjacent to roads is often impractical for at least two reasons. First, known support structures have wide and relatively shallow foundations. Accordingly, they cannot be easily installed adjacent to existing roadways because these foundations would cover existing underground utilities such as sewer and electric lines. Most building codes prevent placing structural foundations over such utilities. Even in cities not having such building code restrictions, it is not desirable to cover existing underground utilities with essentially immovable foundations weighing several tons.

Second, most cities have tall buildings adjacent to its sidewalks. Positioning known support structures on sidewalks would often position the elevated vehicle guideway too close to these buildings. In many cases, a vehicle running on such guideway would not be able to turn without contacting a building.

Finally, known wide and shallow elevated rail support structure foundations do not provide optimal support during seismic activities, such as earthquakes.

FIGS. 1 & 2 show an example of an elevated railed-vehicle system 10 having these characteristics. They depict the Seattle monorail extending from Seattle Center to Westlake Center in Seattle, Wash., U.S.A. This system 10 was constructed in 1962, and includes a traditional spread foundation 12 under street level 14 formed by a block of reinforced concrete weighing approximately 100,000 pounds and being approximately 4 feet high (16), 15 feet wide (18) and 15 feet long (not shown). A T-shaped support 20 includes a central column portion 22, a lower end pedestal portion 24 and an upper T-shaped end portion 26. Two vehicle guideways 28a, 28b are supported one at each end of the T-shaped end portion 26.

The support 20 is one continuous unit constructed of reinforced concrete at the installation site and lifted with cranes so that the pedestal portion may be secured with anchor bolts 30 to the foundation 12. As shown in FIG. 2, because of its size and the requirement to avoid covering any underground utilities, the foundation 12 is positioned below one lane 32 of a four lane road 34 with the support 20 extending from that lane 32, leaving only three lanes available for traffic 36 on the road 34. Moreover, in order for the vehicle 38 to clear buildings 40 adjacent to the road 34, the guideways 28a, 28b must be positioned over the road 34.

Thus, there remains a need for an elevated railed-vehicle support structure and guideway that can be consistently and economically prefabricated off site and easily moved to the installation site, that provides a low profile foundation that can be easily installed without blocking existing underground utilities, and that permits the vehicle rail system to operate effectively over an existing road without requiring the support structure itself to occupy any lanes of that road.

BRIEF SUMMARY OF THE INVENTION

Fulfilling the forgoing needs is the primary objective of the invention. More specific objectives of the invention are to provide an elevated guideway support structure for a railed-vehicle in which the support structure and guideway:

(1) are economical to manufacture, transport and install;
(2) are wear resistant, strong, and durable;
(3) may be prefabricated off-site with known materials and methods;
(4) are constructed of individual, unassembled components sized and shaped for easy transport and assembly;

and also where the support structure:

(5) is shaped to effectively support and elevate a railed-vehicle guideway over an existing road without blocking a lane of vehicle traffic on that road;
(6) is capable of supporting a plurality of railed-vehicle guideways;

(7) effectively supports an elevated railed-vehicle guideway in a cantilevered manner;

(8) includes a foundation that may be installed near existing underground utilities without covering those utilities;

(9) includes a foundation that provides improved support during seismic activities;

(10) provides a low cost, easy to maintain, reliable, relatively simple, and inexpensive solution to the known problems of elevated guideway support structures for a railed-vehicle.

The invention is an improved guideway and support structure for supporting an elevated guideway for a railed-vehicle having individual unassembled components sized for easy transport that may be prefabricated with known materials and methods and transported to and assembled together at the installation site. The support structure is preferably cantilevered and sized to support one or two vehicle guideways. It may include a pile foundation for improved support during seismic activity and to facilitate installation on existing streets and sidewalks without covering or interfering with underground plumbing or utilities.

BRIEF DESCRIPTION OF THE DRAWINGS

FIG. 6A is an elevation view of an elevated guideway support structure of the present invention having a traditional spread foundation and a cantilever support supporting two vehicle guideways.

FIG. 6B is an elevation view of the column of FIG. 6A.

FIG. 6C is an elevation view of the cantilever support of FIG. 6A rotated 90 degrees from its operative orientation.

FIGS. 12A–E show possible cross-sectional shapes for the vertical support and guideway supports of the present invention.

FIG. 17 is a longitudinal elevation view of a support structure with a double guideway.

FIG. 18 is a plan view of the support structure of FIG. 17.

FIG. 19 is a plan view of a support structure that includes a cantilevered guideway.

DETAILED DESCRIPTION OF THE INVENTION

A support structure 50 for an elevated railed-vehicle guideway 52 constructed according to several embodiments of the invention is shown in FIGS. 3A–8B.

General Manufacturing and Assembly

To provide comprehensive disclosure without unduly lengthening the specification, this specification hereby incorporates by reference the disclosures of U.S. Pat. No. 3,710,727 to Svensson which issued on Jan. 16, 1973 and U.S. Pat. No. 5,845,581 to Svensson which issued on Dec. 8, 1998. These references provide greater detail regarding the construction, installation and use of guideways on an elevated railed-vehicle system. In general, a guideway 52 (52a,b shown), also known as a railway, track, or rail, is used by a railed-vehicle 54 (54a,b shown), such as a monorail, to define a predetermined path for supporting and guiding the vehicle 54.

Figure 6D:
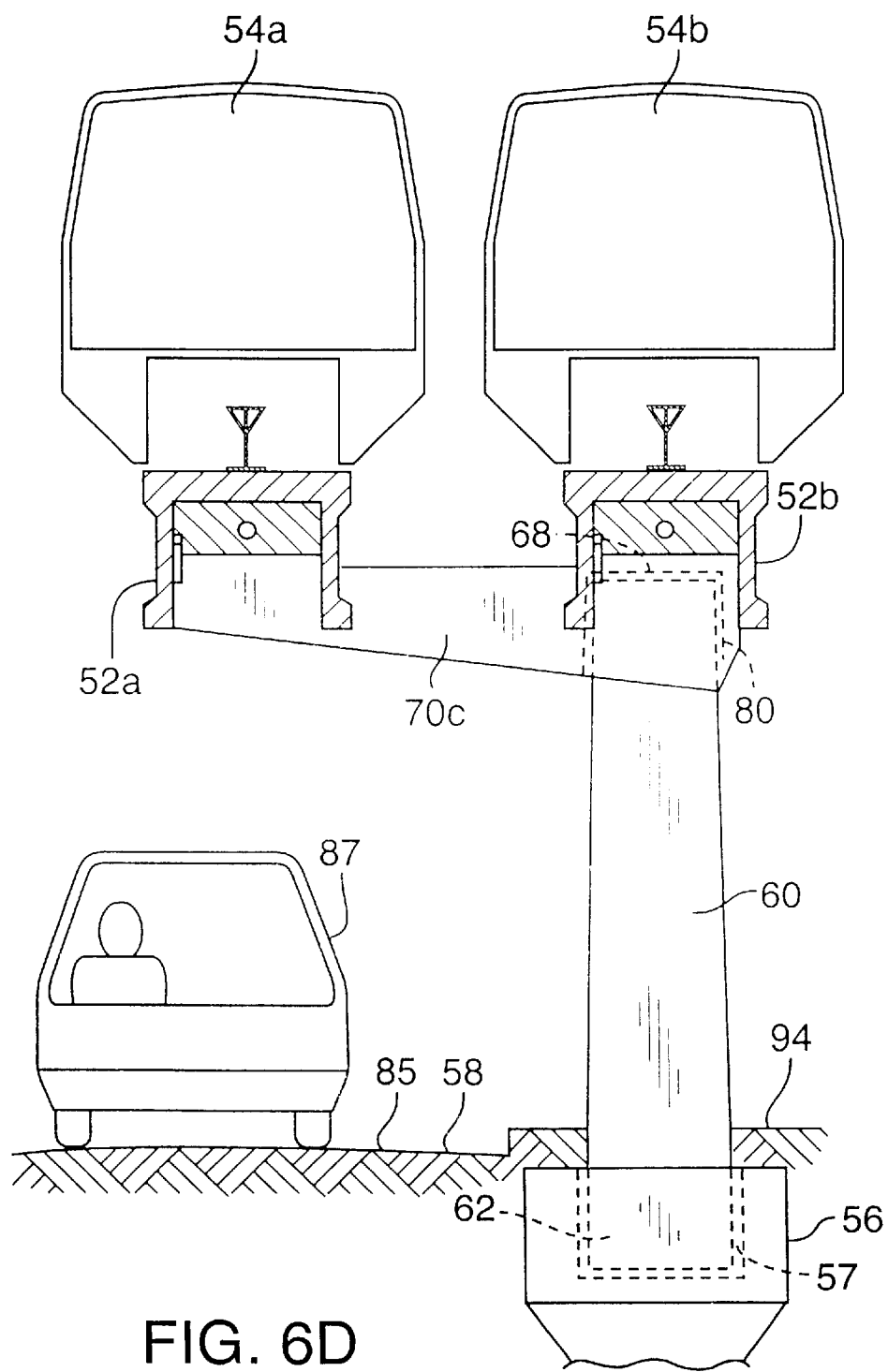
FIG. 6D is an elevation view of an elevated guideway support structure of the present invention having an alternative preferred spread foundation with a recess for attaching the vertical column.

Referring now to FIGS. 3A and 6A–D, the general support structure 50 of an elevated guideway 52 (52a,b shown) for a railed-vehicle 54 (54a,b shown) includes a foundation 56 imbedded within the ground 58 and a vertical column 60 extending above the ground 58 and having a pedestal end 62 secured to the foundation 56 with known means, such as high strength prestressed bolts 64 extending from the foundation through mounting holes 66 received in the pedestal end 62 and bolted in place as shown in FIGS. 3A and 6A or positioning the pedestal end 62 within a conforming recess 57 within the foundation 56 and grouting the column 60 in place as shown in FIG. 6D. The opposite end 68 of the column 60 has mounted therein a guideway support 70. A Y-shaped support 70a is shown here. The ends 72a, 72b of the support include means for attaching guideways 52a, 52b to the support 70, such as with high strength prestressed bolts 64. Each guideway 52a, 52b may include an opening 76 for receiving electrical power and communication cables and the like, and preferably has a width 53 (FIG. 3A) less than the width 55 (FIG. 3A) of the railed vehicle 54. More preferably, width 53 is less than half of width 55.

In general, the foundation 56 is preferably constructed with reinforced concrete that is poured into place with known materials and methods. In cases where mounting bolts 64 (FIG. 3A) will secure the column 60 to the foundation 56, they are mounted in the concrete before it sets. Preferably grouting 65 is secured between the pedestal end 62 and the foundation 56.

As best shown in FIGS. 3B and 3C, the vertical column 60 and support 70 are preferably separate components, each sized and shaped to permit them to be prefabricated off-site, such as at a central manufacturing facility, with known materials and methods. For example, the column 60 and support 70 may be constructed of reinforced concrete, steel or composite materials and easily transported to the installation site. If desired and as best shown in FIGS. 9A–D, the guideway 52 can also be constructed with prefabricated materials that are assembled on-site.

Figure 10A:
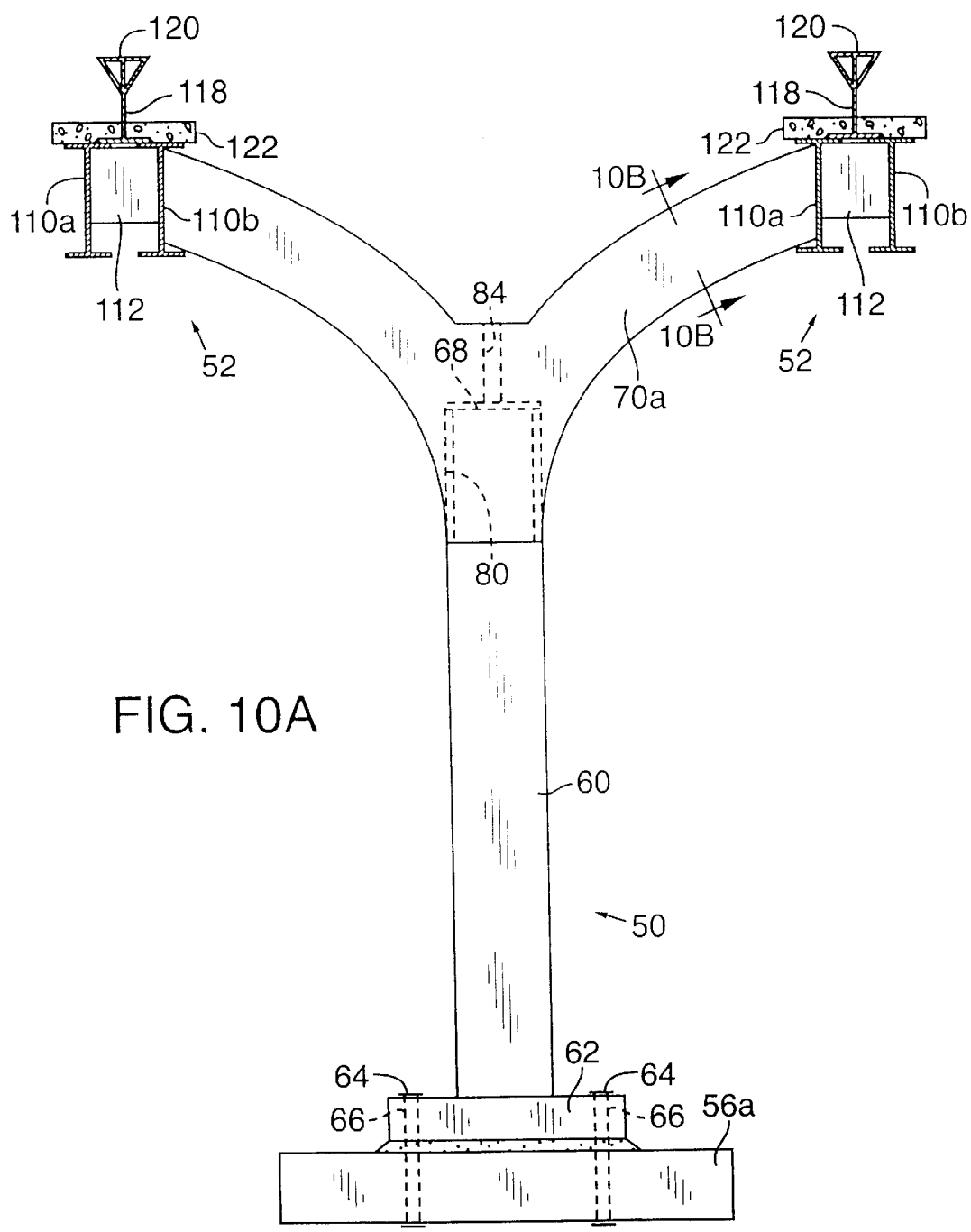
FIG. 10A is an elevation view of an elevated guideway support structure of the present invention having a traditional spread foundation and a symmetrical Y-shaped column support supporting two prefabricated guideways.
Figure 10B:
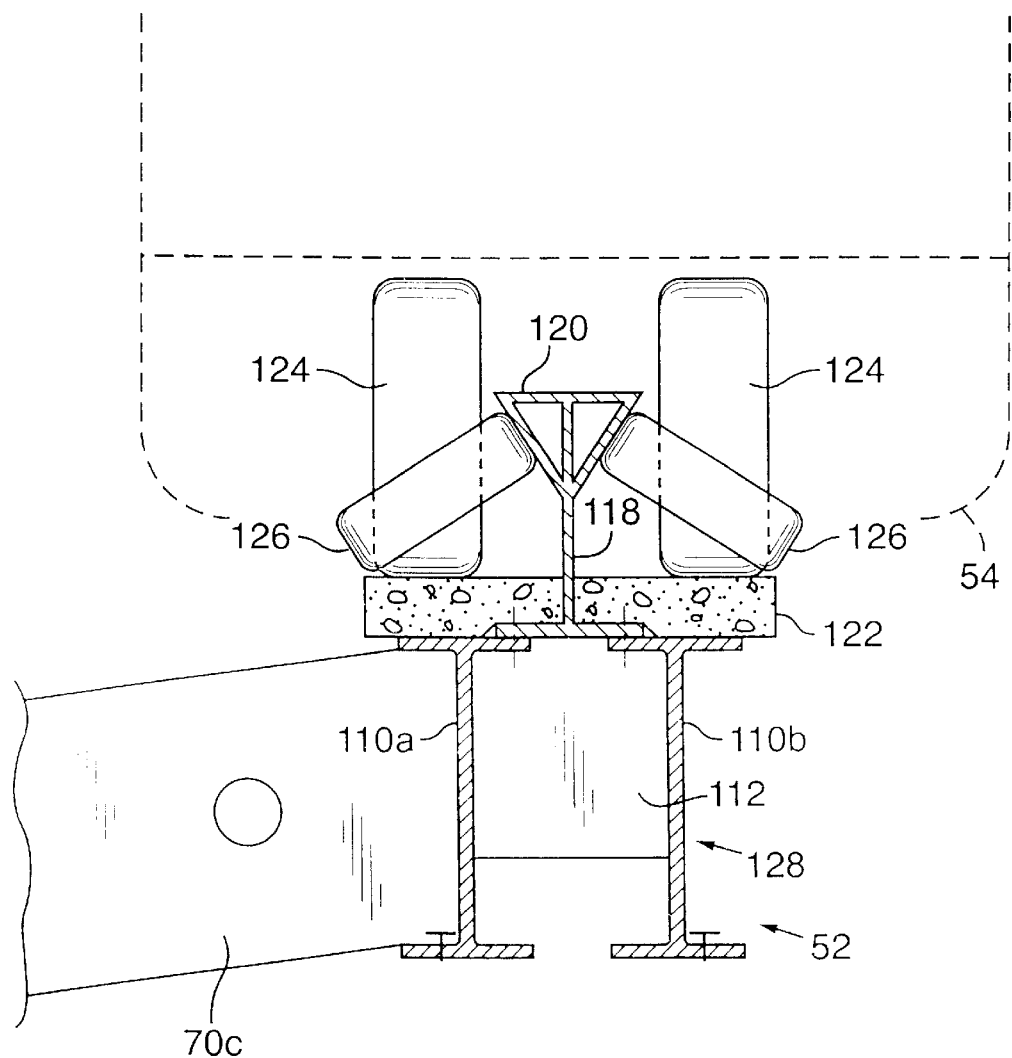
FIG. 10B is an enlarged fragmentary view of the elevated guideway support of FIG. 10A taken along line 10B—10B of FIG. 10A.
Figure 10D:
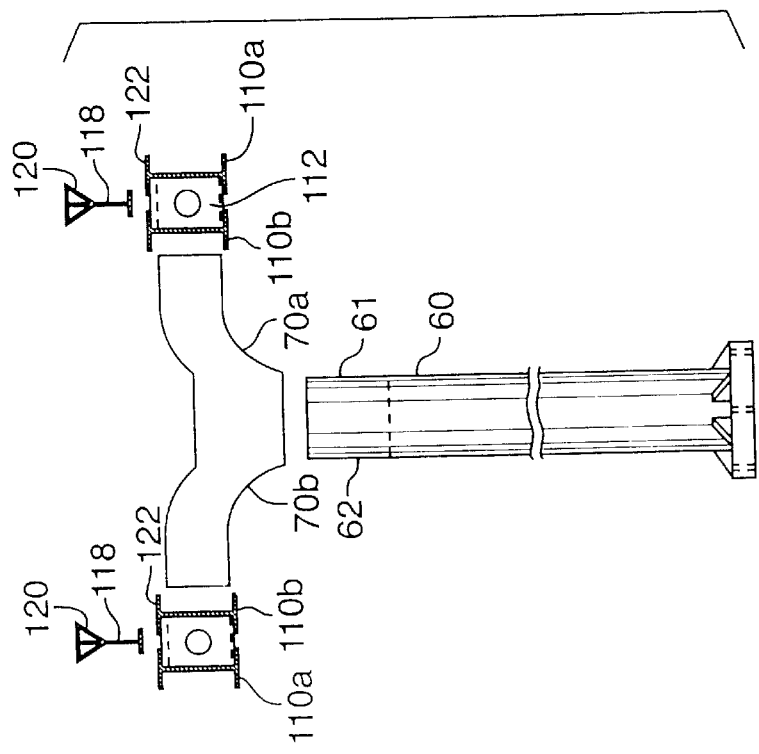
FIG. 10D is an exploded view of the elevated guideway support structure of FIG. 10C.
Figure 10C:
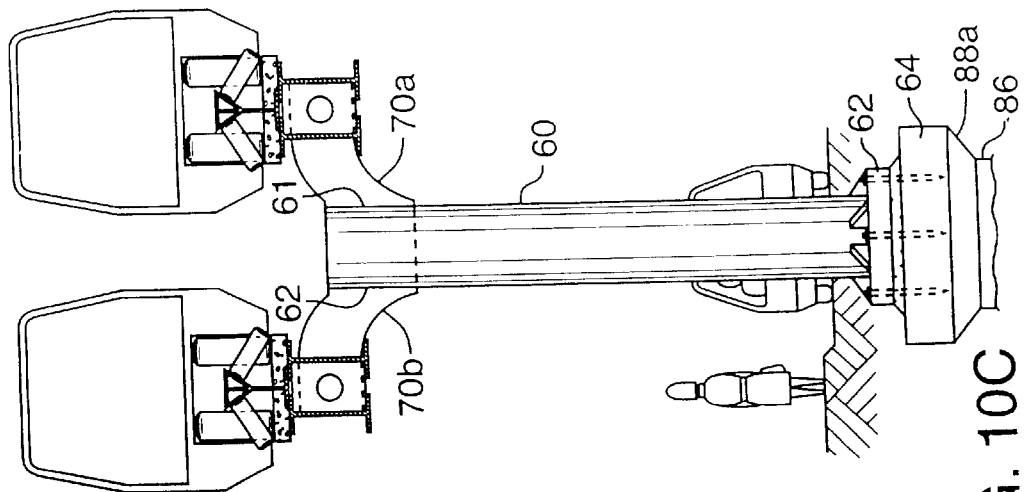
FIG. 10C is an elevation view of an elevated guideway support structure of the present invention having a pile foundation and a resilient symmetrical Y-shaped column support supporting two prefabricated guideways.

As best shown in FIGS. 3A–C, the support 70 and column 60 include attachment means for easily attaching them together, preferably at the installation site. One known attachment means includes the support 70 having a recess 80 sized and shaped to snugly receive the end 68 of the column 60 and be supported by the column 60. The column 60 and support 70 are secured in place with known materials and methods, such as with grouting. In such case, it is desirable to include a grouting opening 84 in the support 70 for ease of introduction of grouting. Examples of other attachment means could include bolts or other fasteners common to the type of material used on the column 60 and support 70. Alternatively, and as shown in FIGS. 10C and 10D, the column 60 may secured within a recess 61 within the column 60.

The particular material used for the support structure 50 can vary depending on the type of vehicle 54 that will run on the guideway 52, the overall weight needed to be supported, and the environmental conditions in which the vehicle 54 will run. Suitable alternative building materials include steel or other alloys, reinforced plastic, and composite materials. For example, in situations where the vehicle 54 is driven by magnetic levitation means, it is usually desirable to construct the guideways 52a, 52b, and possibly the support structure 50, with a suitable non-magnetic material. such as reinforced plastic or the like.

Figure 1:
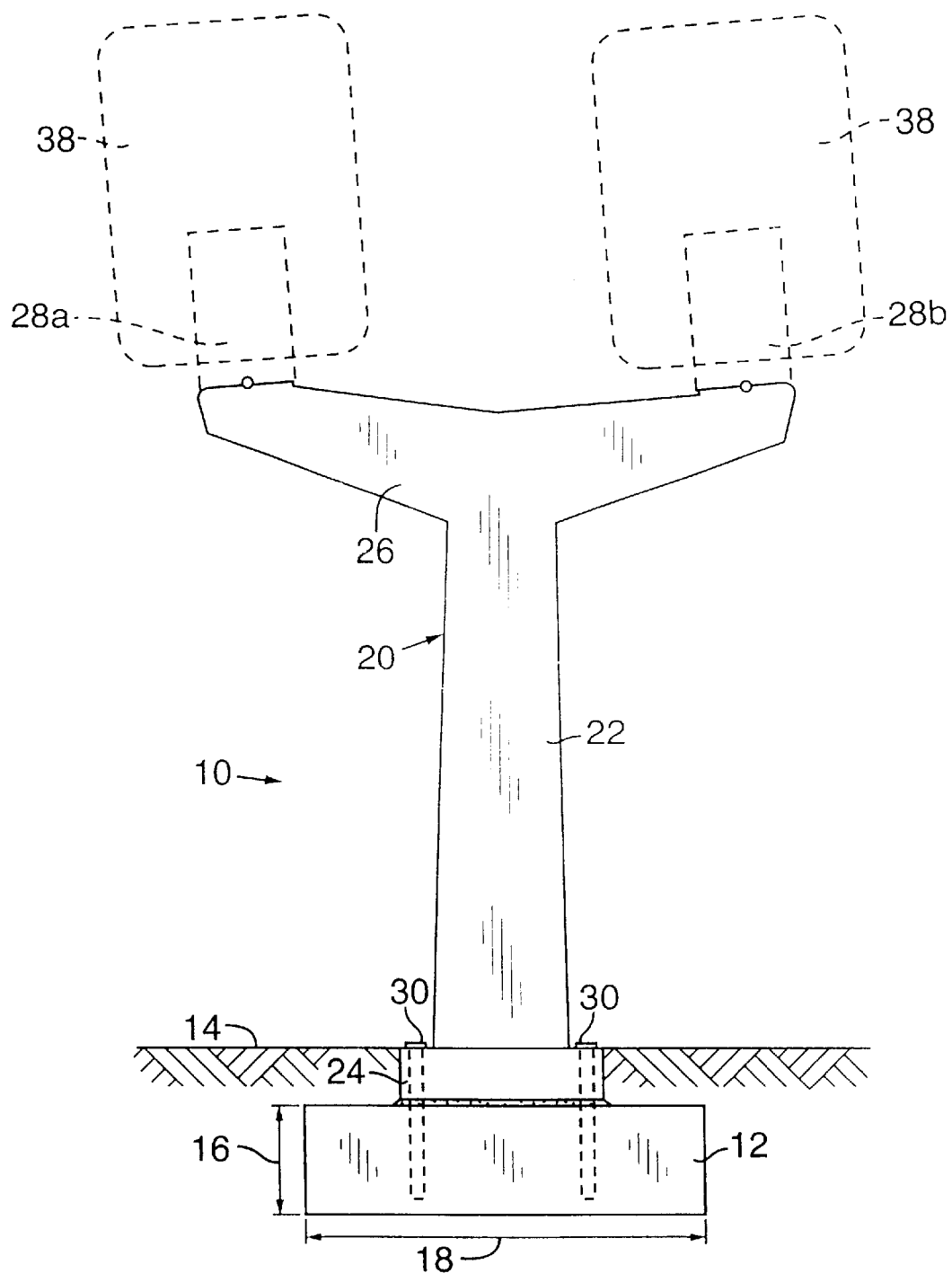
FIG. 1 (Prior Art) is an elevation view of a prior art elevated guideway support structure for a railed-vehicle having a traditional spread foundation.
Figure 2:
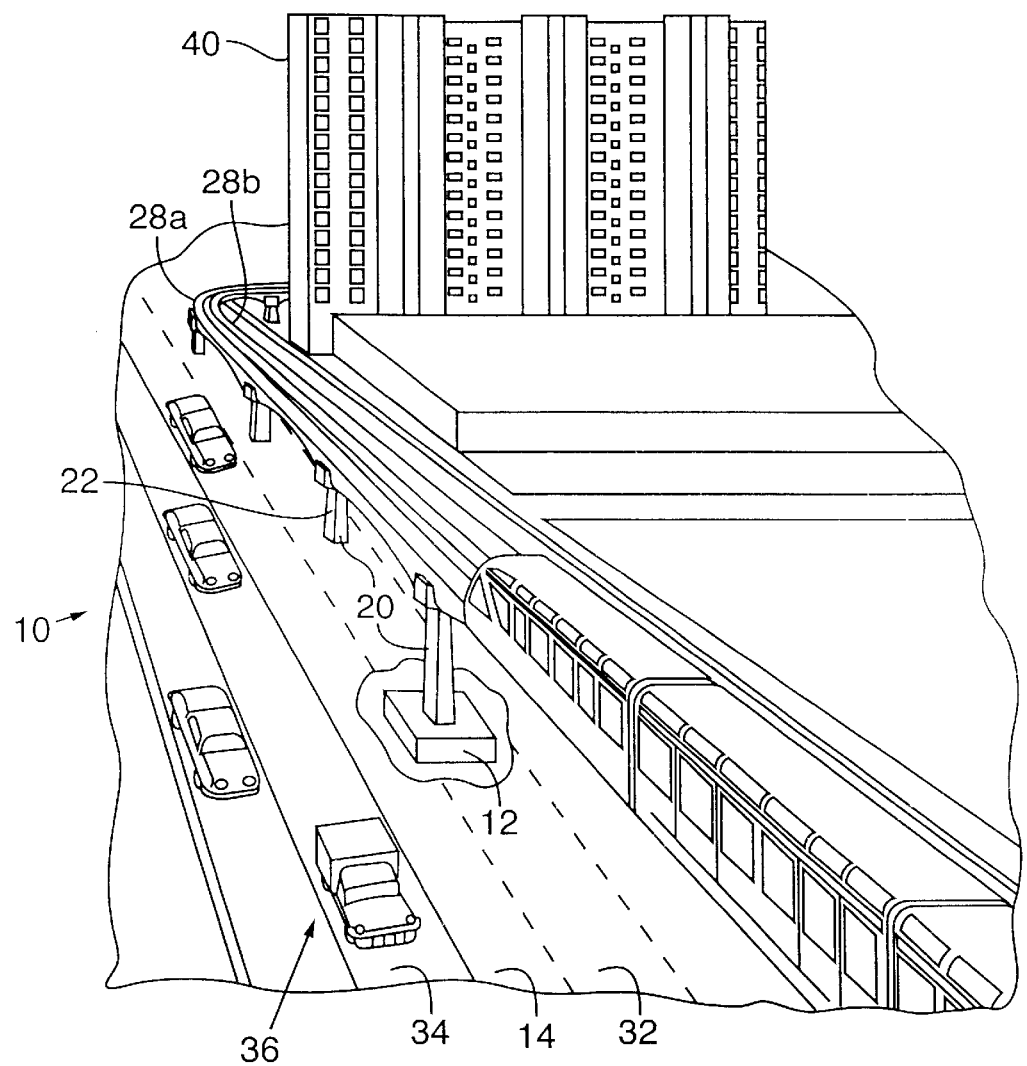
FIG. 2 (Prior Art) is an isometric view of a prior art support structure of FIG. 1 in use.
Figure 3:
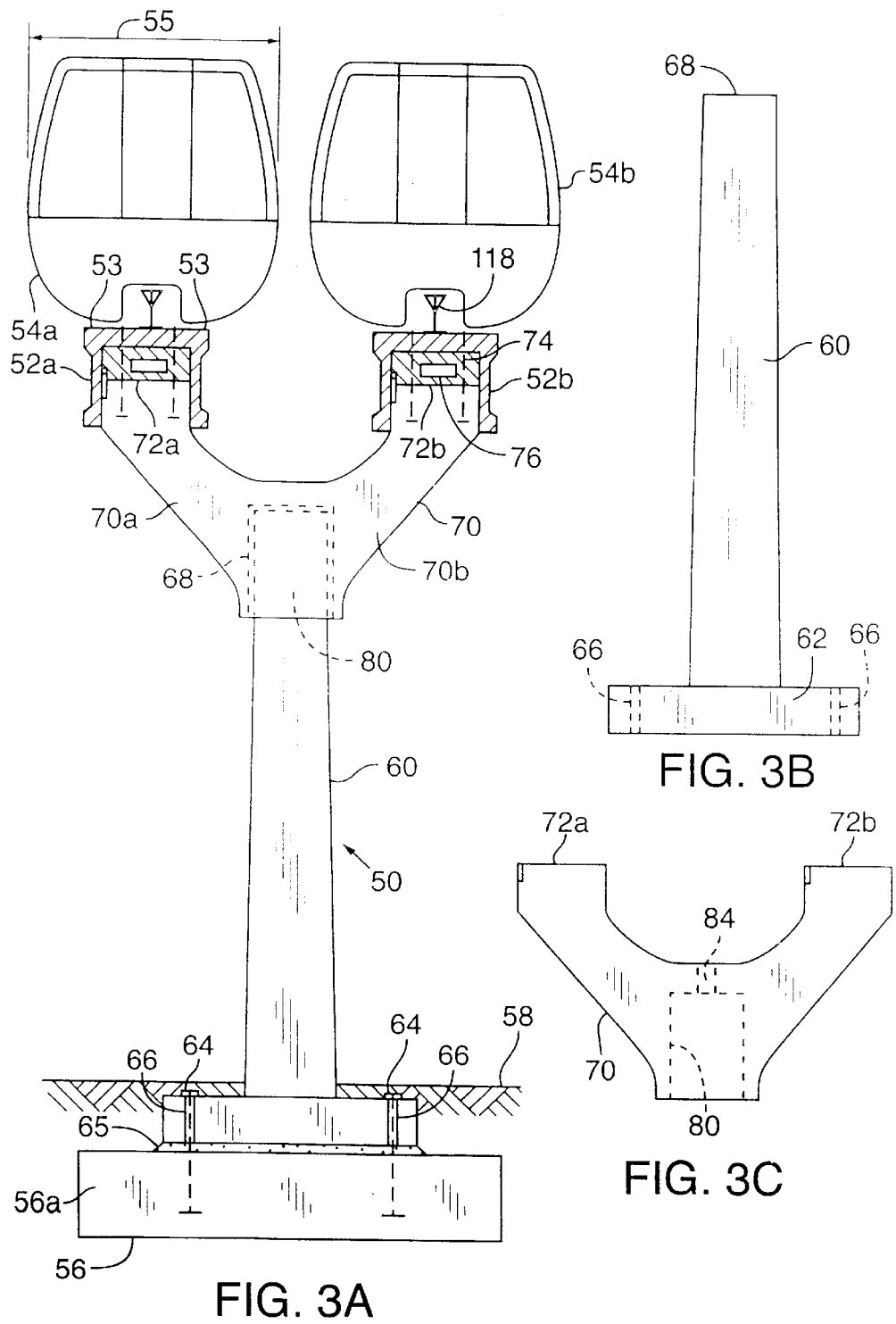
FIG. 3A is an elevation view of an elevated guideway support structure of the present invention having a traditional spread foundation and a symmetrical Y-shaped column support supporting two guideways.
FIG. 3B is an elevation view of the column of FIG. 3A.
FIG. 3C is an elevation view of the symmetrical Y-shaped column support of FIG. 3A rotated 90' from its operative orientation.

The smaller size of the column 60 and guideway support 70 components making up the support structure 50 compared to the known unibody support structures 20 as shown in FIGS. 1 and 2, make these components lighter and more portable. Therefore, these components can be mass produced at a central manufacturing facility, then loaded onto trucks, trains, or ships and transported worldwide. In situations where the column 60 must be particularly long, it may be manufactured in sections and assembled on-site for ease of transport. For even greater ease of transportation, the sections may be sized to fit within each other for transport. The mass production of these components at a climate and quality controlled central facility results in reduced costs and increased quality of each support structure 50.

Description of Preferred Guideway Supports

Figures 10E, 10F:
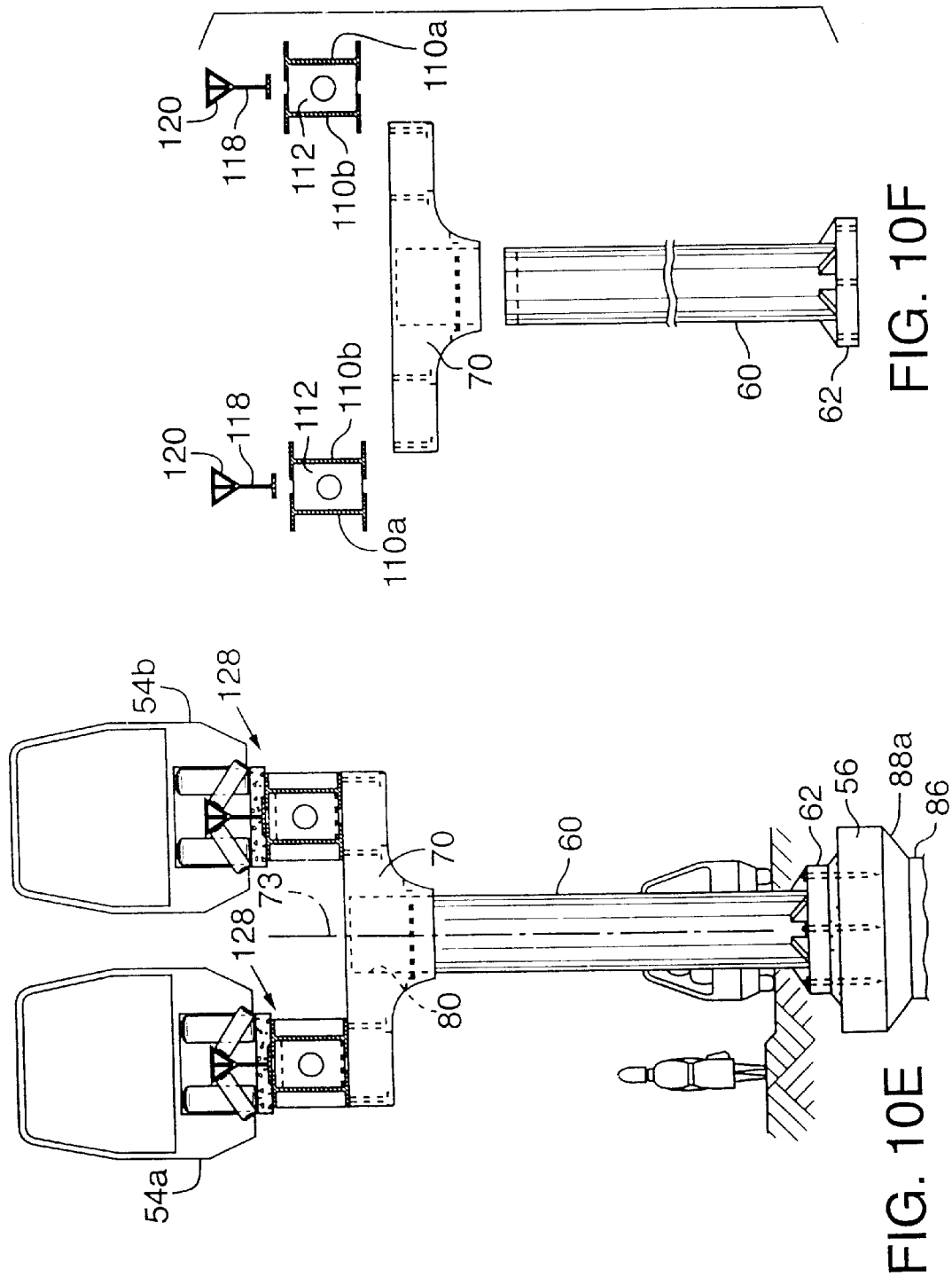
FIG. 10E is an elevation view of an elevated guideway support structure of the present invention having a pile foundation and a resilient symmetrical T-shaped column support supporting two prefabricated guideways.
FIG. 10F is an exploded view of the elevated guideway support structure of FIG. 10E.

Within this basic framework of the present invention, it should be appreciated that the particular shape of the support 70 may be readily modified to accommodate single or multiple guideways, and to position the guideways 52a, 52b at optimal locations with respect to the column 60. For example, and as previously discussed, FIGS. 3A and 3C show a Y-shaped guideway support 70a permitting one guideway 52a, 52b to be positioned on each end of the Y-shaped support 70a. FIGS. 10E and 10F show a T-shaped guideway support 70. Similarly, as shown in FIGS. 12A–12E the cross-sectional shape of the support 70 and column 60 may be modified to accommodate a particular design, structural, material, or aesthetic need.

Figure 4:
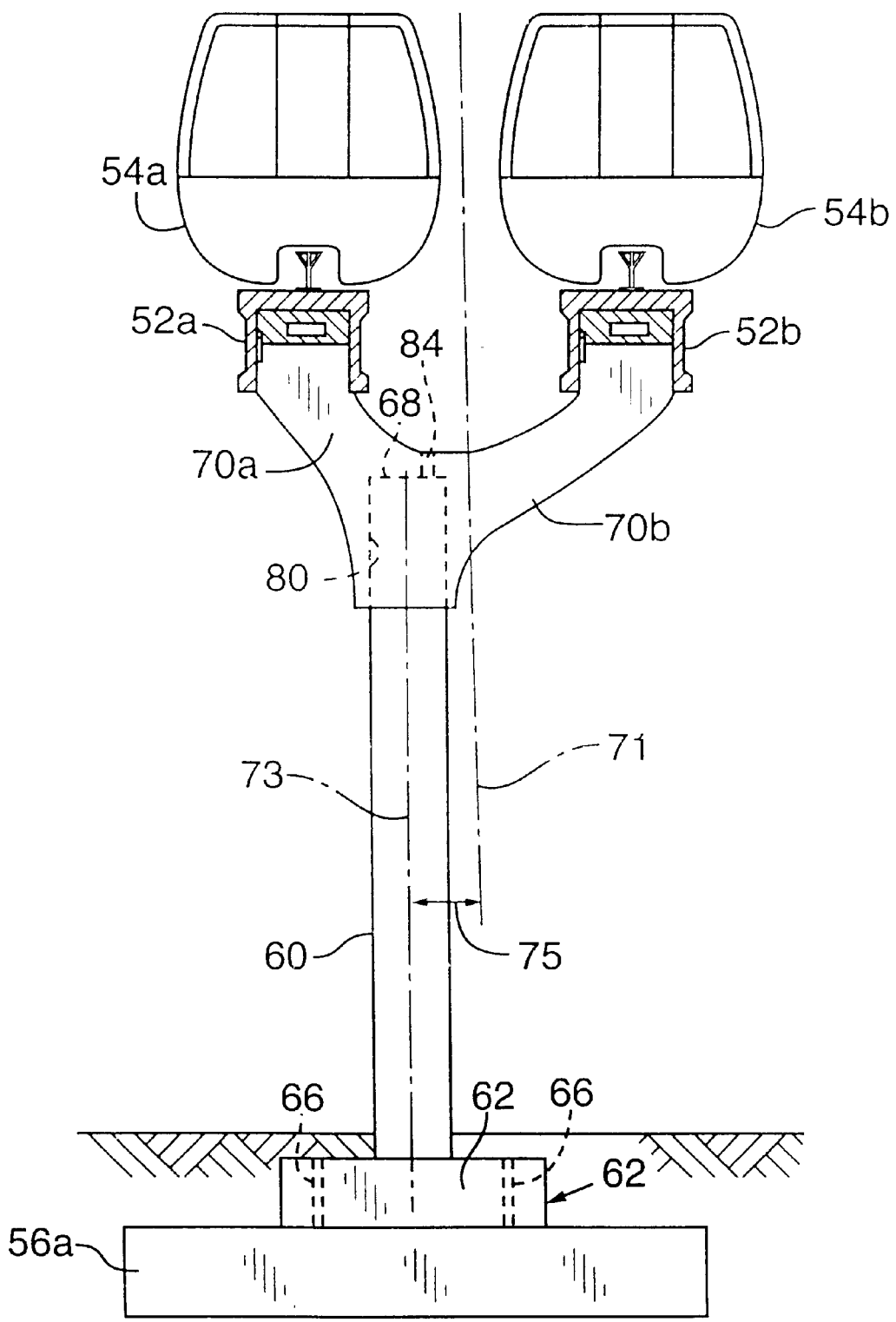
FIG. 4 is an elevation view of an elevated guideway support structure of the present invention having an offset Y-shaped support supporting two guideways.

Referring now to FIG. 4, an offset Y-shaped guideway support 70b may also be used. With this support 70b, the centerline 71 of the two guideways 52a, 52b is displaced from the centerline 73 of the column 60 by a predetermined offset 75 as shown. The offset 75 permits one of the guideways (here guideway 52a) to be positioned closer to the column 60, thereby permitting the column 60 to be placed closer to existing structures without risk of the vehicle 54 contacting obstacles such as adjacent buildings.

Figure 5:
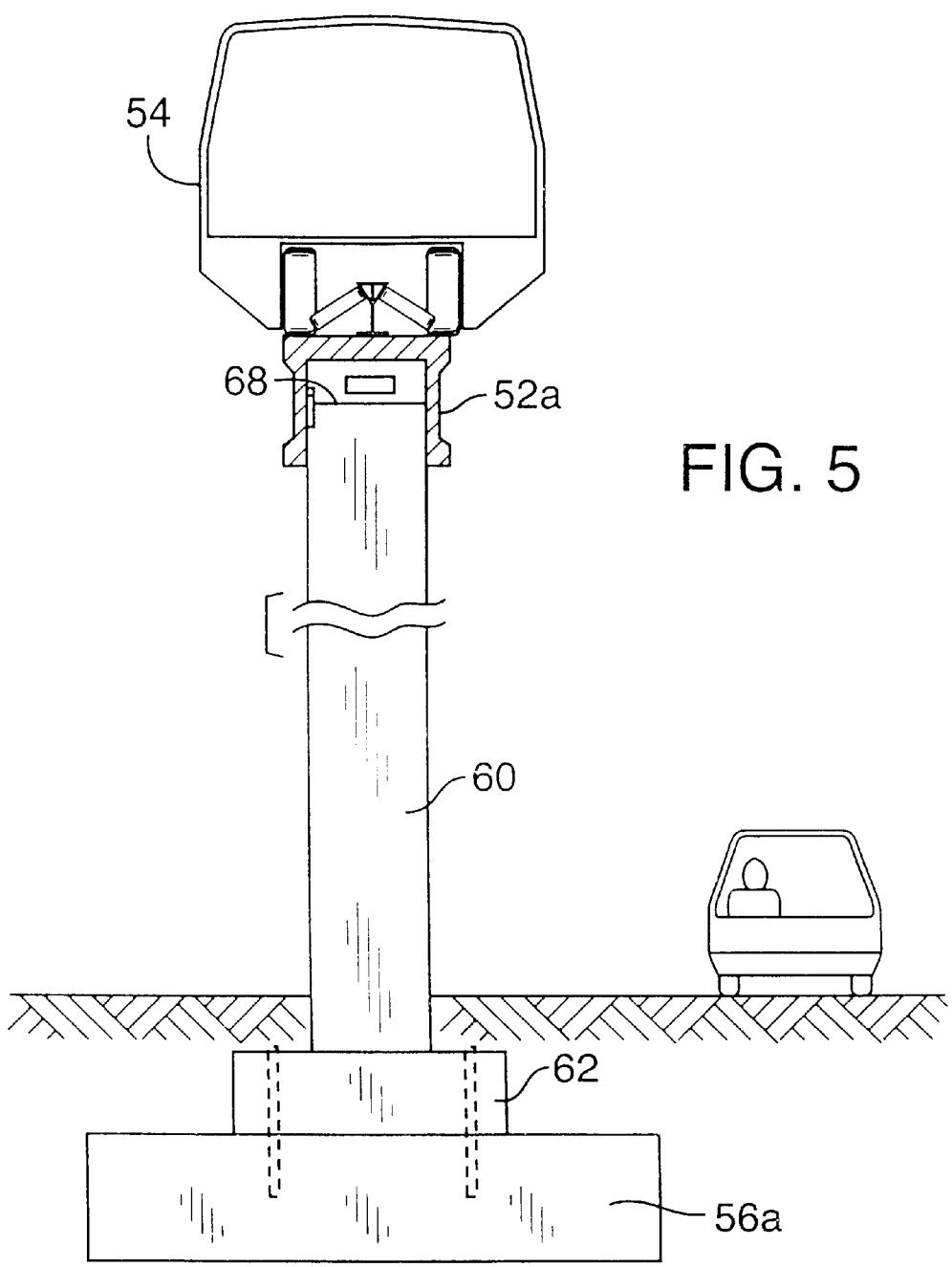
FIG. 5 is an elevation view of an elevated guideway support structure of the present invention having an elevated single guideway.

Referring now to FIG. 5, in cases where it is desirable to have only one elevated guideway 52a, it may be placed directly on the prefabricated column 60 as shown.

Also, as shown in FIGS. 6A–8B, the guideway support 70c may be cantilevered from the column 60 as shown in FIGS. 6A–8B. Cantilevering the guideway support 70c as shown, permits the column 60 to be secured to a foundation 56a positioned adjacent to a road 85, thereby allowing all lanes of the road below the guideways 52a, 52b to remain open for vehicular traffic 87. Preferably, one (FIG. 7A) or two (FIG. 6A) guideways may be secured to the cantilevered guideway support 70c.

Description of Preferred Support Structure Foundations

The foundation 56 for each support structure 50 may be modified depending on the particular installation circumstances present at the location where a particular support structure will be installed. In many situations it is desirable to use a traditional spread foundation 56a as previously described and shown in FIGS. 1A, 3A, 5A, and 6A. Its wide and shallow structure, preferably of rebar reinforced poured concrete, offers a strong and stable foundation from which to attach the column 60 connected to any of the previously described guideway supports 70a,b,c (FIGS. 3A, 4, 5, 6A, and 7A).

Alternatively, as shown in FIGS. 7A–8B, a pile foundation 56b can also be used. The pile foundation 56b is formed with known materials and methods by boring a cylindrical hole into the ground 58, and filling it with a suitable foundation materials, such as steel rebar reinforced concrete to form a deep cylindrical structure 86 of foundation material. One known method to construct the pile foundation 56b includes using a rotary drill to drill and simultaneously excavate the soil. A steel caisson pipe made in sections and having the same diameter as the drill is inserted during excavation to support the soil during excavation and form a mold for forming the pile, a prefabricated reinforcement cage is then inserted into the mold and concrete is poured in and allowed to harden forming the pile foundation 56b.

Preferably the ends of the structure 86 have belled-out portions 88a, 88b as shown that are also formed with a suitable foundation material, such as reinforced concrete. In cases where mounting bolts 64 (FIG. 7A) are used to secure the column 60 to the foundation 56b, they are secured within the upper belled-out portion 88a before the concrete sets. Alternatively, the column 60 may be secured within a conforming recess 57 in the foundation as shown in FIG. 6D and grouted in place.

The result is a long, narrow foundation 56b that may be easily positioned without covering underground utilities such as water pipes 90 or sewer lines 92. Accordingly, the pile foundation 56b is particularly useful for positioning the support structure 50 on sidewalks 94 which have several underground utilities running beneath them. Moreover, the deep penetration and belled-out end portions 88a, 88b of the foundation 56b increase the overall stability of the foundation, particularly to resist seismic conditions such as earthquakes.

Description of Preferred Guideways

The support structure 50 will support a wide variety of guideways 52 including those disclosed in U.S. Pat. No. 3,710,727 to Svensson which issued on Jan. 16, 1973 and U.S. Pat. No. 5,845,581 to Svensson which issued on Dec. 8, 1998.

Preferably, the guideway is constructed with relatively small, lightweight components that may be easily manufactured off-site and transported to the installation area. One such guideway 52 is shown in FIGS. 9A–D. A pair of prefabricated girders, or longitudinal I-beams, 110a, 110b arranged parallel to each other and secured together with stiffener plates 112 to form a box girder assembly 128 extends between and is supported by successive support structures 50. Box girder assembly 128 can be supported by any of the guideway supports 70a–c, or directly by the column 60 as previously described. If desired, it may also be attached to the sides of these structures as shown in FIGS. 10A and 10B.

Figure 9A:
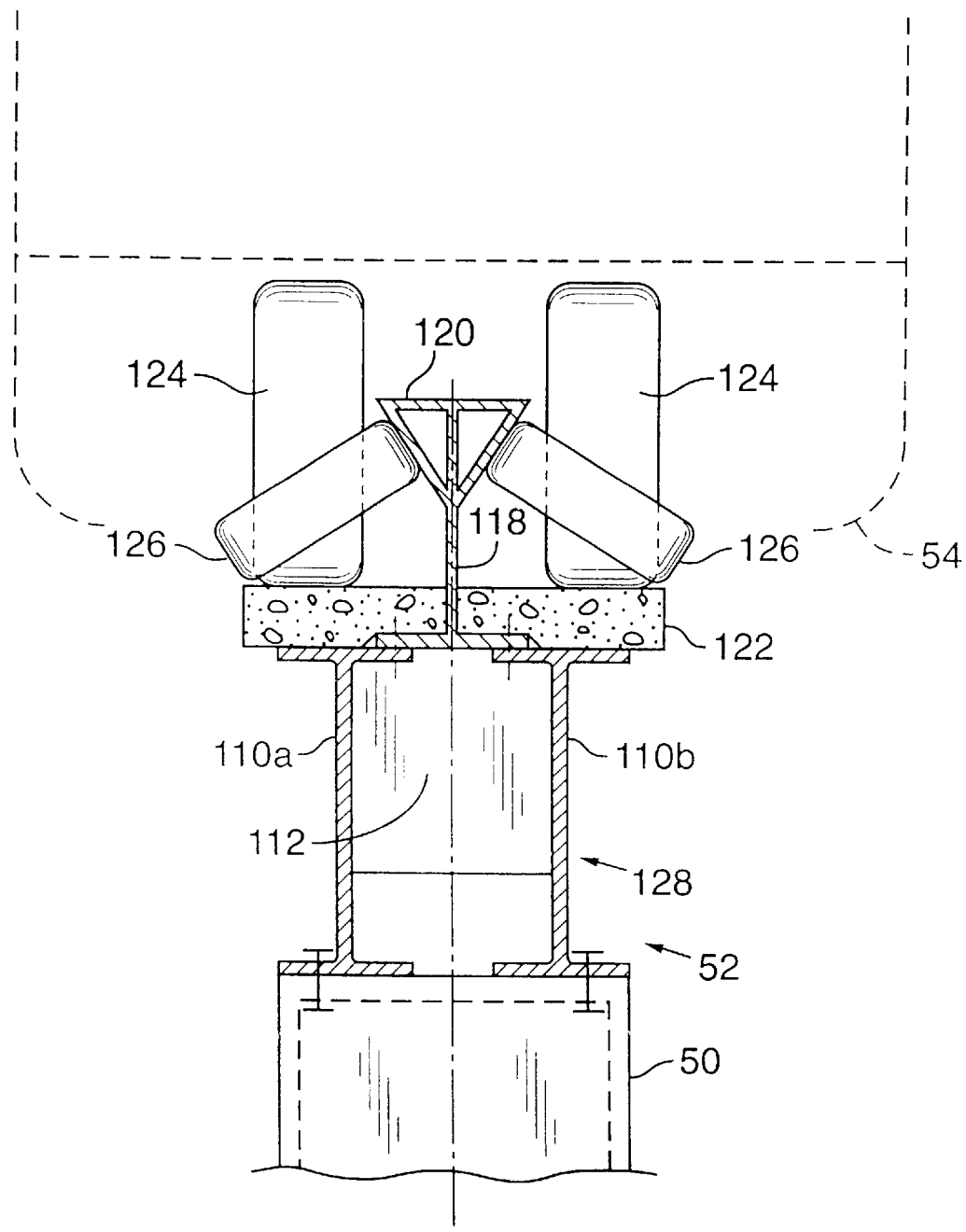
FIG. 9A is a cross-sectional elevation view of a prefabricated guideway in accordance with a preferred embodiment of the present invention having a railed-vehicle thereon.
Figures 9B, 9C, 9D:
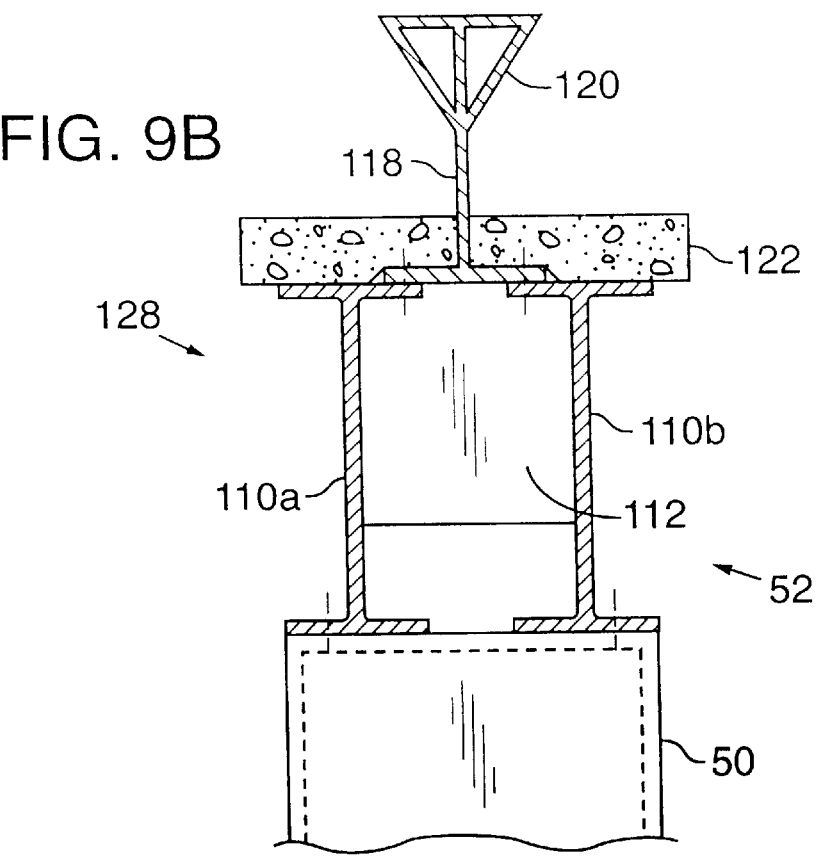
FIG. 9B is a cross-sectional elevation view of the guideway of FIG. 9A without a railed-vehicle thereon.
FIG. 9C is a cross-sectional elevation view of the box girder of the guideway of FIG. 9A.
FIG. 9D is a cross-sectional elevation view of the guide rail of the guideway of FIG. 9A.

A guide rail 118, preferably constructed of an elongate I-beam and having an upwardly and outwardly extending head 120, is secured on top of and centrally aligned between the pair of girders 110a, 110b as shown in FIG. 9A. A vehicle runway 122, preferably constructed of steel reinforced concrete, is placed on top of the girders 110a, 110b and adjacent to the guide rail 118 as shown. The girders 110a, 110b, guide rail 118, stiffener plates 112 and runway 122 can be made with any suitable materials including steel, reinforced plastic, composite materials, or high strength, slender prestressed concrete.

Preferably during use, a railed-vehicle 54 having a plurality of drive wheels 124 and guide wheels 126 travels along the vehicle runway 122. In particular, the drive wheels 124 are supported by the vehicle runway 122, while the guide wheels 126 follow the upwardly and outwardly extending head 120 of the guide rail 118.

In light of the prefabricated components used, assembling the guideway 52 on-site is simplified. First, the pair of girders 110a, 110b are secured together with stiffener plates 112 by known methods such as bolting or welding to form a box girder assembly 128. The box girder assembly 128 may be assembled remotely or on-site. The box girder assembly 128 is then lifted into position so that it rests horizontally on and is suspended between two successive support structures 50. The box girder assembly 128 is then secured to each support structure 50. Then, the guide rail 118 is secured in place on the top of the box girder assembly 128 with known means and methods such as welding or bolting. Finally, the runway 122 is constructed on top of the box girder assembly 128 by forming a mold and precision pouring concrete of sufficient thickness within that mold.

Figure 11:
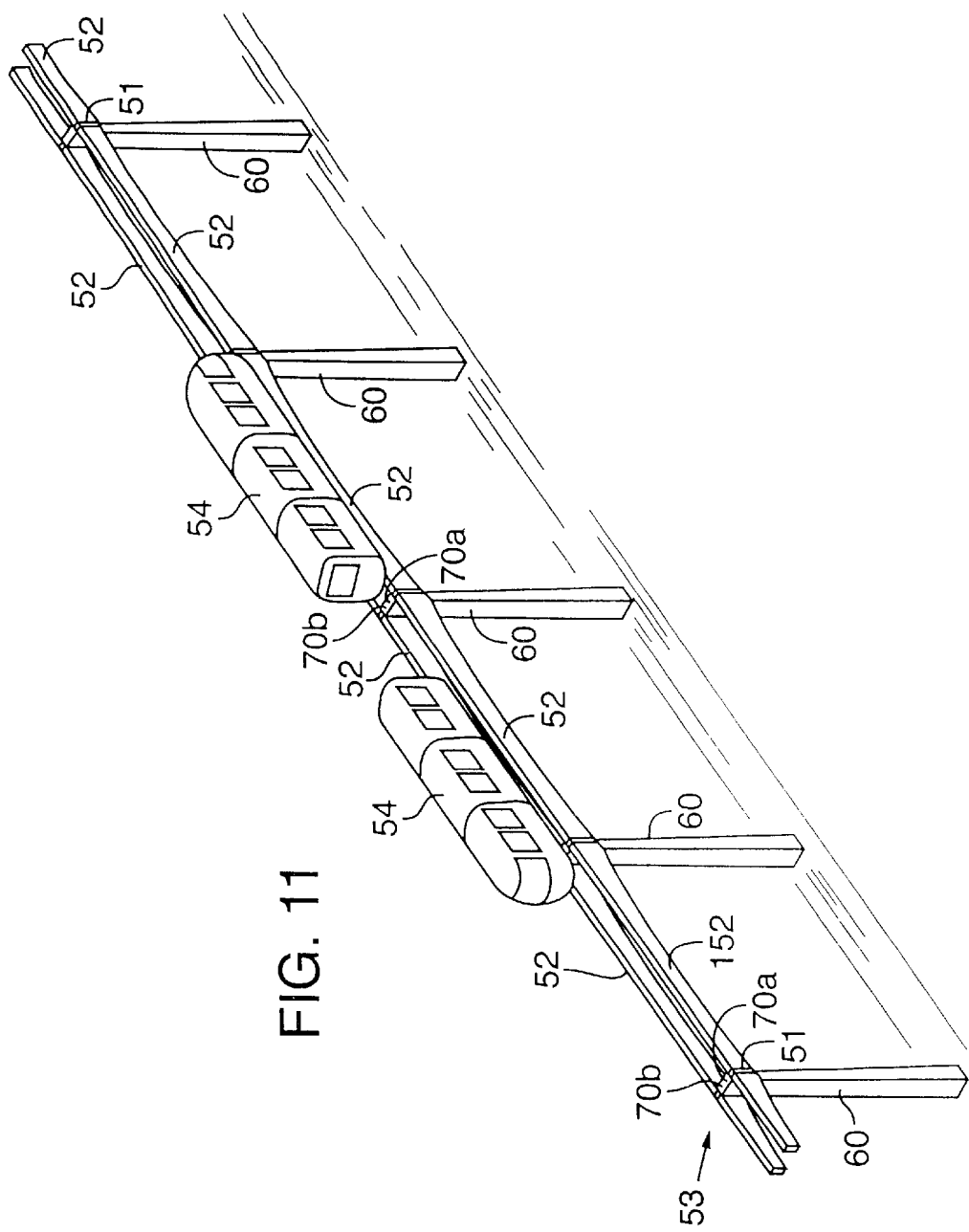
FIG. 11 is an isometric view of several elevated guideway support structures to show possible alignment and application.

Successive sections of the guideway 52 may be formed in the same manner and joined together to form a continuous elongate guideway 53. As shown in FIG. 11, an expansion joint 51, preferably a dual expansion column, is provided at predetermined distances along the elongate guideway 53, preferably at every 4 to 6 sections of guideway 52. In such case, and as best shown in FIGS. 10C–D and 11B, supports 70a and 70b are sized, shaped and constructed with suitable materials to deflect or flex slightly in response to loads exerted on the elongate guideway 53. Such loads include loads associated with traveling and braking trains, the expansion of materials associated with temperature effects, and slight displacement associated with normal settling of foundations. With such an elongate guideway, the longitudinal forces such as braking, wind, and temperature forces are distributed over five columns 60 for an elongate guideway 53 comprising four sections of guideway 52 between expansion joints 51 and seven columns for an elongate guideway 53 comprising six sections of guideway 52 between expansion joints. Distributing these forces over multiple columns 60 allows each column to be more slender and of lighter weight than prior art columns.

Moreover, curved-shaped girders 110a, 110b and guide rails may be used to make curved guideway sections.

Description of Selected Preferred Embodiments

In light of the variety in guideway support shapes 70a,b,c and available support structure foundations 56a,b, a variety of combinations of these elements are available to accommodate the particular support structure needs of a given project. The following descriptions provide a representative sample of the various combinations of these elements. It is not intended to be exhaustive.

A first preferred combination of elements is shown in FIGS. 3A–3C. It features the symmetrical Y-shaped guideway support 70a supporting two guideways 52a,b. The support is secured to column 60 which rests on a traditional spread foundation 56a.

FIG. 4 shows a second preferred combination where the column 60 rests on a traditional spread foundation 56a with the offset Y-shaped guideway support 70b supporting two guideways 52a,b. A third preferred combination is shown in FIG. 5 which shows the same column 60 and foundation 56a of FIG. 4 supporting a single guideway 52a without any sort of independent guideway support there between.

FIGS. 6A–6C show a fourth preferred combination whereby the cantilevered guideway support 70c supports two guideways 52a,b. The support 70c is secured to column 60 which rests on a traditional spread foundation 56a.

Figure 7A:
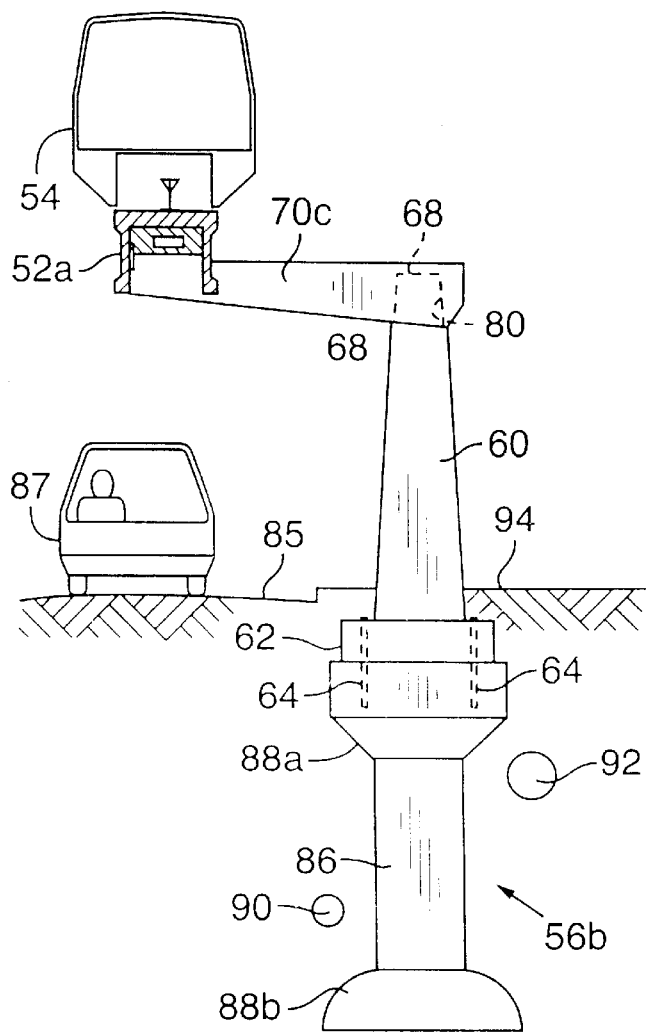
FIG. 7A is an elevation view of an elevated guideway support structure of the present invention having a pile foundation and a cantilever column support supporting one guideway.
Figure 7B:
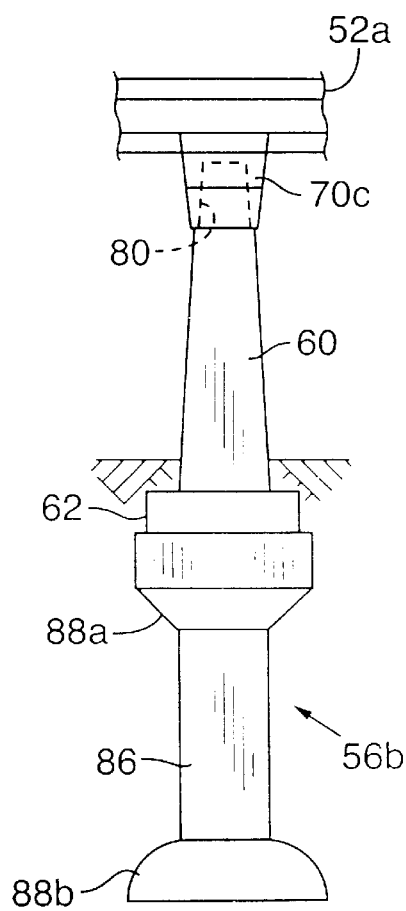
FIG. 7B is a side view of the support structure of FIG. 7A.
Figure 8A:
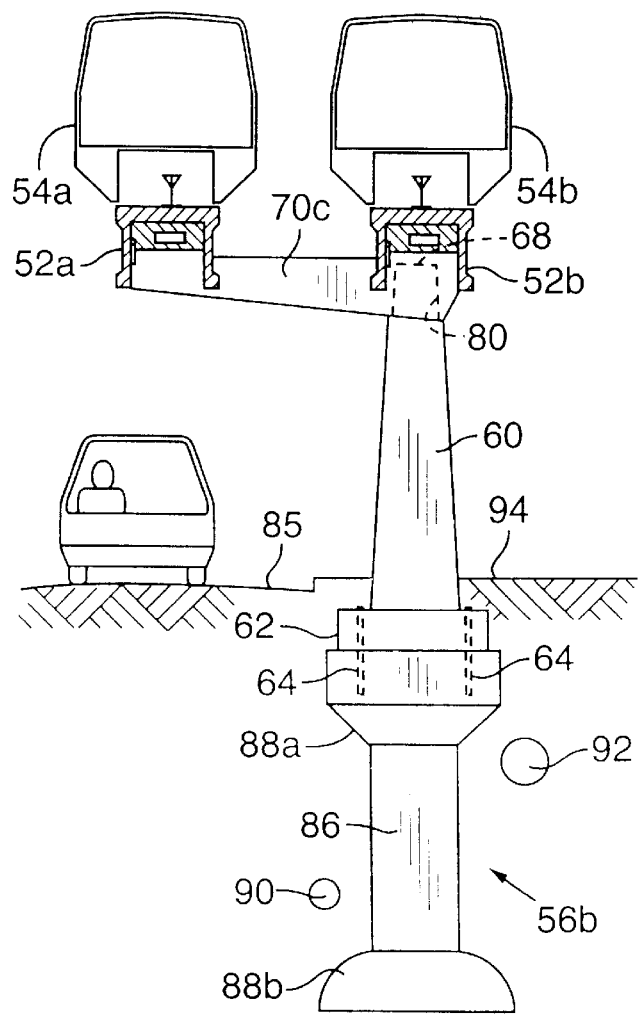
FIG. 8A is an elevation view of an elevated guideway support structure of the present invention having a pile foundation and a cantilever column support supporting two guideways.
Figure 8B:
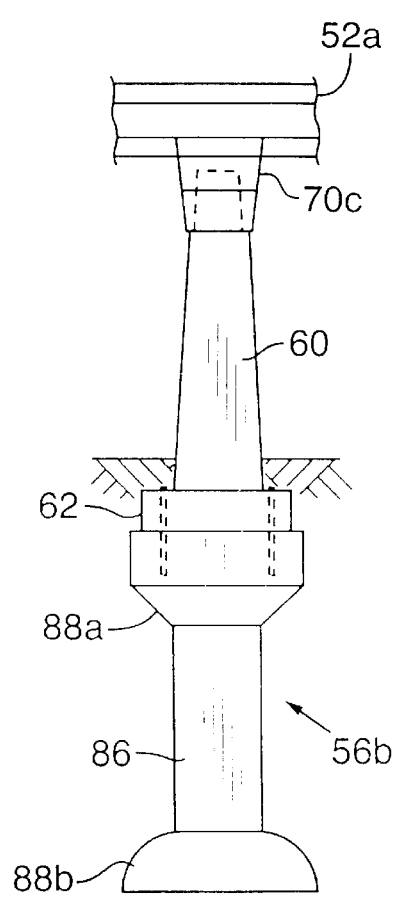
FIG. 8B is a side view of the support structure of FIG. 8A.
Figure 8C:
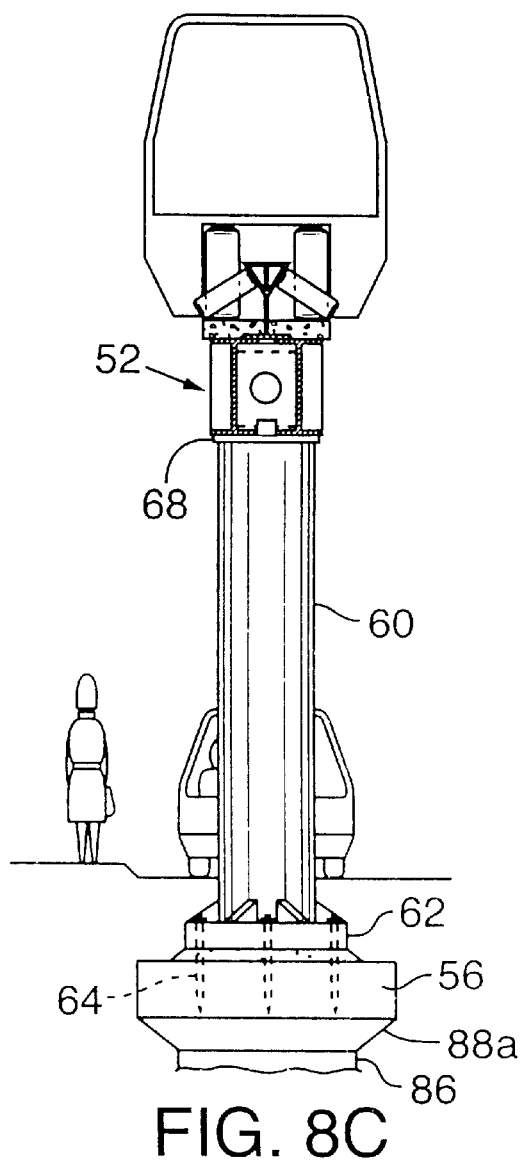
FIG. 8C is an elevation view of an elevated guideway support structure of the present invention having a pile foundation a vertical column having a circular cross-section supporting a single elevated guideway.
Figure 8D:
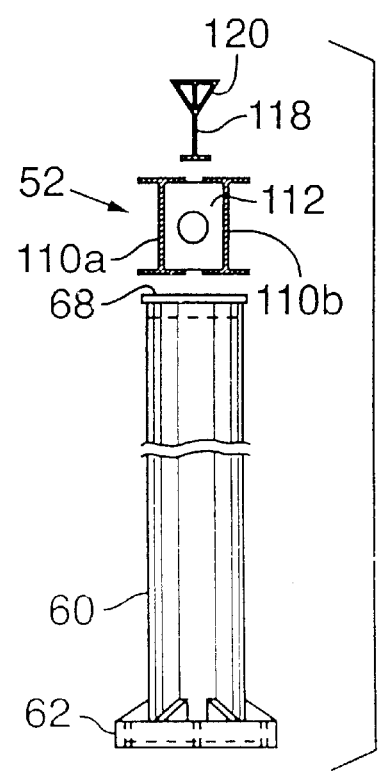
FIG. 8D is an exploded view of the support structure of FIG. 8C.

A fifth preferred combination is shown in FIGS. 7A–7B which show the cantilevered guideway support 70c supporting one guideway 52a, and the support 70c is supported by column 60 which rests on pile foundation 56b. The sixth preferred combination, shown in FIGS. 8A–8B, includes the basic configuration of the fifth preferred combination, except the cantilevered guideway support 70c supports two parallel guideways 52a, 52b.

Description of a Column Structure Having an Integral Guideway Support

As described above, support structure 50 includes a guideway support 70 that may be prefabricated and then attached to column 60 at the installation site. Alternatively, a support structure 150 that integrally-combines the features and functions of column 60 and guideway support 70 may be used. Support structure 150, depicted in FIGS. 13 through 18, includes a foundation 56, which may be a spread foundation 56a or a pile foundation 56b, as described above. In addition, support structure 150 includes a pair of columns 160 that extend between foundation 56 and a guideway 152 such that guiderail 118 and vehicle 54 are elevated above the surrounding terrain.

Columns 160 are preferably a pair of inclined, curved columns that diverge from a pedestal base 162 and in a direction of guideway 152, thereby forming a Y-shaped configuration when viewed from the side. Suitable materials for columns 160 include steel, aluminum, reinforced concrete, and composite materials, for example. The particular material chosen, however, should depend upon the specific application for which support structure 150 is intended to be used. If, for example, vehicle 54 is magnetically levitated, a non-magnetic material may be most suitable.

Columns 160 are preferably produced at a central manufacturing facility and transported to the construction site. Each column 160 is integrally-formed with a common pedestal base 162. Pedestal base 162 is structured to attach to foundation 56. A variety of techniques may be employed to attach pedestal base 162 to foundation 56. For example, pedestal base 162 may be secured using high-strength, prestressed bolts 64 that extend from foundation 56. Alternatively, pedestal base 162 may be configured such that a portion of pedestal base 162 is positioned within a recess in foundation 56, with reinforcing steel protruding from foundation 56 and pedestal base 162, and then grouted into position.

As each column 160 approaches guideway 152, the thickness of each column 160 increases such that support ends 166 flare outward to provide a broad support for guideway 152. With reference to column 166b in FIG. 13, for example, an outer edge 168a of column 160b continues to curve outward as column 160b approaches guideway 152. Inner edge 168b, however, curves around so as to extend in the opposite direction of outer edge 168a, thereby forming a wide support end 166b and a broad base for guideway 152. The primary purposes of support end 166 are to securely attach guideway 152 to support structure 150 and make a continuous, rigid guideway 152. As with pedestal base 162 and foundation 56, a variety of techniques may be employed to secure guideway 152 to support structure 150, depending upon the construction material used. With respect to concrete, for example, reinforcing steel protruding from column 160 and guideway 152 may be grouted to form a rigid unit. For steel, high-strength bolts or welding may be used.

Figure 15:
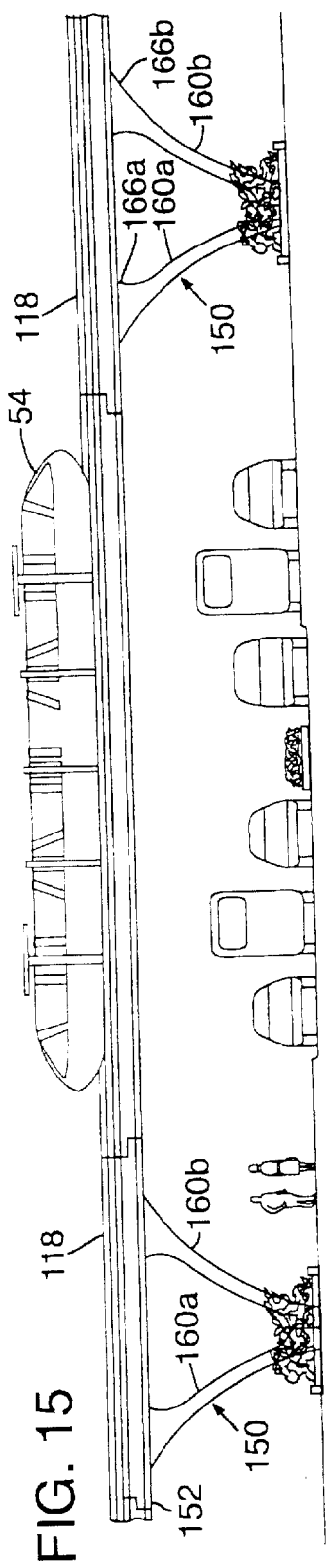
FIG. 15 is a side elevation view of a monorail system with a pair of support structures and a vehicle located on a guideway.
Figure 16:
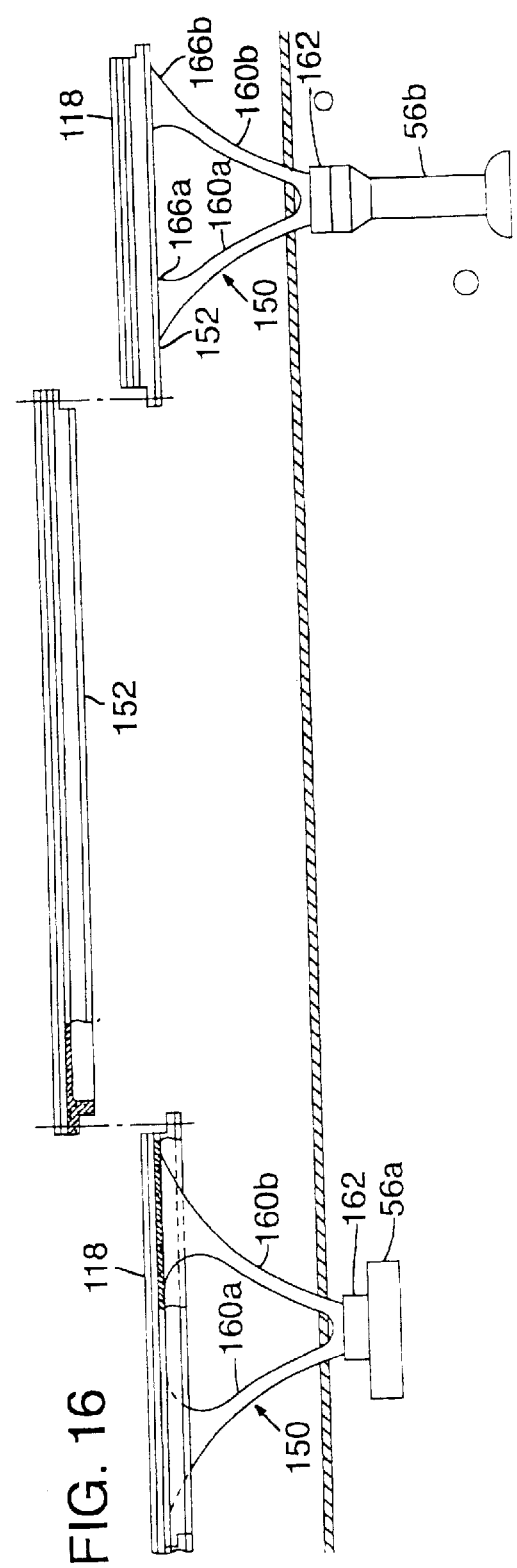
FIG. 16 is a schematic of the monorail system in FIG. 15.

The size and configuration of support structure 150, especially when columns 160 are formed separately, permits the various components to be mass produced at a central manufacturing facility and then transported worldwide to various construction sites where assembly occurs. A further benefit relates to the length of guideway 152 that may be disposed between two support structures 150. In many applications, it may be necessary for guideway 152 to cross over pre-existing roadways, as depicted in FIG. 15, or other features of the terrain such as rivers and ravines. Advantageously, two support structures 150 may be spaced at least 150 feet (45.7 meters) apart, a distance that is sufficient to support a guideway 152 that extends over six lanes of traffic. To manufacture a monorail system that spans preexisting roadways, support structures 150a and 150b may be assembled on the sides of the roadway and a separate, drop-in section of guideway 152 that is disposed between support structures 150a and 150b may be lowered into position, as depicted in FIG. 16, thereby causing minimal disruption of traffic on the roadway.

Support structure 150 may be used to support one or more guideways 152. FIGS. 17 and 18 depict a configuration of support structure 150 wherein each column 160 branches in a direction that is transverse to guideways 152 so as to support two parallel guideways 152, each having a vehicle 54. FIG. 17 also shows an optional brace member 155 spanning the branches of the column 160 for use in certain applications.

Figure 13:
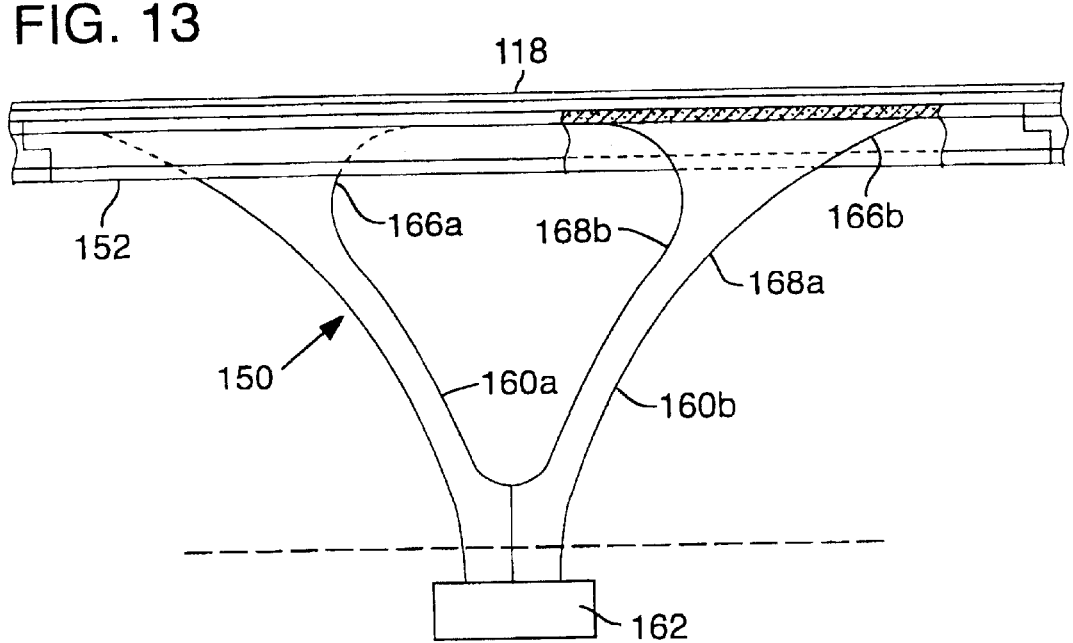
FIG. 13 is a side elevation view of a support structure according to an alternate embodiment of the present invention.
Figure 14:
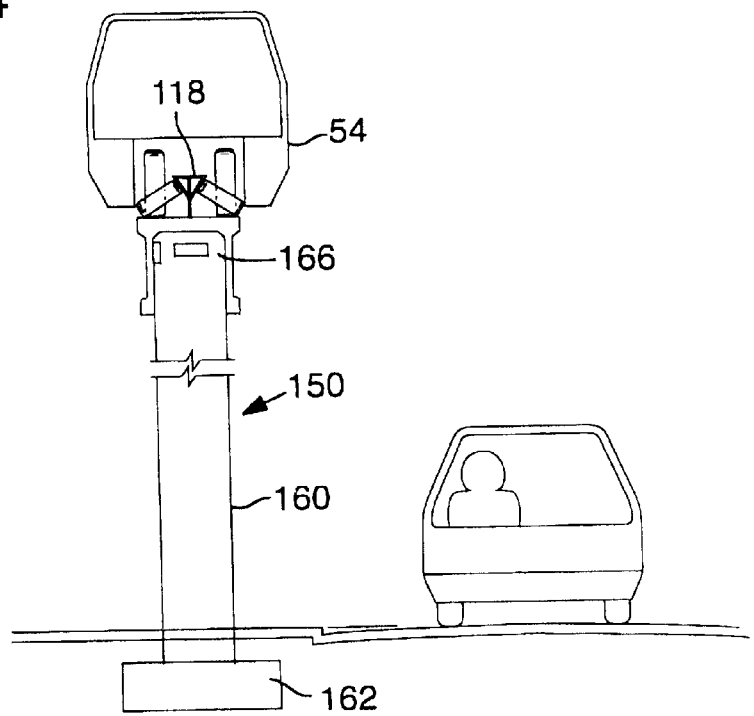
FIG. 14 is a longitudinal elevation view of the support structure in FIG. 13 with a single guideway.

When viewing support structure 150 from the side, as in FIGS. 13 and 15, support structure 150 is viewed from the longitudinal direction. That is, when viewing support structure 150 along the longitudinal length of guideways 152, columns 160 will have a Y-shaped configuration. From the top, as depicted in FIG. 18, each column 160 forms a V-shaped configuration Guideway 152 may be formed to include one or more cantilevered sections 153 that extend beyond guideway supports 166, as depicted in FIG. 19. As discussed above, two support structures 150 may be spaced at least 150 feet apart. When spaced at this distance, the length of the separate, drop-in section of guideway 152 that is located between support structures 150 may be decreased by adding cantilevered sections 153 to the portion of guideway 152 attached directly to guideway supports 166.

Practical and Economic Advantages

The practical and economic advantages of a Y-shaped support structure 150 relate to the longer bridgings (spans) that may be applied to cross wide highways, rivers, or ravines, thereby requiring fewer foundations. The Y-shaped configuration of support structure 150 may be used to bridge distances that are 50 percent longer, when compared with conventional vertical columns.

Preferred Support Structure Construction Method

As previously noted, it is desirable to mass produce the column 60, guideway support 70a,b,c, and columns 160 at a central manufacturing facility. The specific method of mass production will depend on the type of material used. However, in situations where it is desirable to use concrete imbedded with steel rebar reinforcement, mass production would include the following steps.

First, molds of the columns and guideway supports are made with known materials and methods. Second, steel rebar is placed in the mold and positioned at optimal locations so as to provide the most strength to the ultimate product. Third, concrete is poured into the molds and allowed to harden. Fourth, the reinforced concrete column and support are removed from the molds. This process is repeated several times resulting in a plurality of columns and supports. Finally, a sufficient supply of the columns and supports are transported from the manufacturing facility to the ultimate installation site for assembly on site as previously described.

Having described and illustrated the principles of the invention with reference to preferred embodiments thereof, it should be apparent that these embodiments can be modified in arrangement and detail without departing from the principles of the invention. For example, the column 60, guideway support 70a,b,c, and columns 160 may be constructed from several component parts that each may be easily transported and assembled together. Similarly, the overall shape of the column 60, guideway support 70a,b,c, columns 160 or foundation 56a,b may be modified to accommodate specific aesthetics or obstacles. Also, if desired, the column 60, foundation 56a,b, guideway supports 70a,b,c, and columns 160 may be sized and shaped to accommodate more than two guideways.

In view of the wide variety of embodiments to which the principles of the invention can be applied, it should be apparent that the detailed embodiments are illustrative only and should not be taken as limiting the scope of the invention. Rather, the claimed invention includes all such modifications as may come within the scope of the following claims and equivalents thereto.

That which is claimed is:

1. A support structure for an elevated monorail vehicle, said support structure comprising:
   at least one guideway having a width less than the width of the vehicle;
   a pair of inclined columns diverging from a base in a direction of said guideway to thereby form a first Y-shaped configuration, the columns having portions that are curved in the direction of said guideway, the columns terminating in guideway supports located opposite said base and configured to attach to said guideway, the columns each having a greater dimension in the direction of the guideway adjacent the respective guideway support than adjacent the base; and
   a foundation attached to said base for supporting said guideway and columns, said guideway and columns forming discrete, prefabricated components that may be transported prior to assembly using conventional transportation methods.

2. The support structure of claim 1, wherein each said column supports at least two guideways.

3. The support structure of claim 2, wherein each said column branches in a direction transverse to said guideway to form a first said guideway support and a second said guideway support, each said column thereby having a second Y-shaped configuration.

4. The support structure of claim 3, wherein said first said guideway support attaches to a first said guideway and said second said guideway support attaches to a second said guideway, said first said guideway being parallel to said second said guideway.

5. A support structure for an elevated monorail vehicle, said support structure including:
   at least one guideway having a width less than the width of the vehicle;
   a pair of inclined, curved columns curving and diverging from an integral base in a direction of said guideway to thereby form a first Y-shaped configuration, each said column including a guideway support located opposite said base, said guideway support being configured to attached two said guideways; and
   a foundation attached to said base for supporting said guideway and columns, said guideway and columns forming discrete, prefabricated components that may be transported prior to assembly using conventional transportation methods;
   wherein said guideway includes cantilevered sections that extend in a longitudinal direction from ends of said columns.

6. The support structure of claim 1, wherein said foundation is a pile foundation.

7. The support structure of claim 6, wherein said pile foundation includes an elongated column having two ends, each said end having a belled-out portion.

8. The support structure of claim 1, wherein a top portion of said guideway includes a vehicle runway and a vehicle guide rail, said vehicle guide rail having a vertical web that supports a head.

9. The support structure of claim 1, wherein a prefabricated, drop-in guideway section is disposed between a first said support structure and a second said support structure, said guideway section, said first said support structure, and said second said support structure forming a continuous runway for said vehicle.

10. The support structure of claim 1, wherein said support structure is formed of materials that include at least one of the group consisting of steel, aluminum, concrete, and composite materials.

11. A support structure for an elevated monorail vehicle, said support structure comprising:
    at least one guideway having a width less than the width of the vehicle;
    a first column and a second column having an inclined configuration that diverges in a direction of said guideway from a base to thereby for a first Y-shaped configuration, the columns having portions that are curved in the direction of said guideway, at least said first column including a guideway support located opposite said base, said guideway support flaring outward relative to a central portion of said first column to form an elongate area for supporting said guideway, said elongate area having a greater dimension in the direction of the guideway than a dimension of the first column in the direction of the guideway, and said guideway support being configured to attach to said guideway; and
    a foundation attached to said base for supporting said guideway and columns, said guideway and columns forming discrete, prefabricated components that may be transported prior to assembly using conventional transportation methods.

12. The support structure of claim 11, wherein each said column supports at least two guideways.

13. The support structure of claim 12, wherein each said column branches in a direction transverse to said guideway to form a first said guideway support and a second said guideway support, each said column thereby having a second Y-shaped configuration.

14. The support structure of claim 13, wherein said first said guideway support attaches to a first said guideway and said second said guideway support attaches to a second said guideway, said first said guideway being parallel to said second said guideway.

15. The support structure of claim 11, wherein said elongate area of said guideway support has a width that is at least three times a width of said central portion of said first column.

16. The support structure of claim 11, wherein said second column includes another guideway support located opposite said base, said guideway support of said second column flaring outward relative to a central portion of said second column to form an elongate area for supporting said guideway, and said guideway support of said second column being configured to attach to said guideway.

17. The support structure of claim 11, wherein said guideway includes cantilevered sections that extends in a longitudinal direction from said ends of said columns.

18. The support structure of claim 11, wherein said foundation is a pile foundation.

19. The support structure of claim 18, wherein said pile foundation includes an elongated column having two ends, each said end having a belled-out portion.

20. The support structure of claim 11, wherein a top portion of said guideway includes a vehicle runway and a vehicle guide rail, said vehicle guide rail having a vertical web that supports a head.

21. The support structure of claim 11, wherein a prefabricated, drop-in guideway section is positioned between a first said support structure and a second said support structure, said guideway section, said first said support structure, and said second said support structure forming a continuous runway for said vehicle.

22. The support structure of claim 11, wherein said support structure is formed of materials that include at least one of the group consisting of steel, aluminum, concrete, and composite materials.

23. A support for supporting an overriding monorail guideway, the support comprising:
    a base;
    a pair of columns extending upwardly from the base and diverging from each other, the columns terminating at respective guideway supports;
    the guideway supports being spaced from each other in a first direction parallel to an axis of a guideway to be supported;
    the guideway supports having respective support surfaces;
    the columns having portions that are curved in the first direction; and
    the support surfaces of the guideway supports having a greater dimension in the first direction than the base.

24. A support structure for an overriding monorail vehicle, the support comprising:
    a pair of uninterrupted guideways extending approximately parallel to each other in a first direction;
    a base;
    a pair of columns extending upwardly from the base and diverging from each other in the first direction;
    each of the pair of columns having two upwardly extending legs that diverge from each other in a second direction transverse to the first direction;
    the legs terminating in respective guideway support surfaces separated from each other in the first and second directions, each of the guideways being positioned above and supported from below by a pair of the guideway support surfaces that are aligned in the first direction.

25. A forked support member for supporting an elevated guideway for an overriding monorail vehicle comprising a base and two columns extending from the base and diverging from each other in a forked configuration, the columns terminating in guideway support surfaces, wherein, viewed from a side elevation, each column has an interior curved surface and an opposing exterior curved surface, the respective interior curved surfaces initially diverging from each other adjacent the base and continuously converging toward each other adjacent the support surfaces.

26. The forked support member of claim 25, wherein the respective exterior surfaces of the support members, viewed from a side elevation, do not converge toward each other.

27. The forked support member of claim 25, wherein, viewed from the side elevation, a distance separating the ends of support members is at least three times a dimension of the base.

28. A support structure system for an overriding monorail vehicle, comprising:
    at least two first pieces spaced from each other over a ground surface by a desired spanning distance, the first pieces having:
        at least one first guideway having an elongate shape with opposing first guideway ends, the first guideway defining a first direction; and
        an elevated support member for supporting the first guideway, the support member having a pair of columns that extend upwardly from the ground surface and diverge from each other in the first direction, the columns being adapted for attachment to the guideway at two places spaced in the first direction such that the first guideway ends are overhanging; and
    at least one second piece having:
        a second guideway sized for the spanning distance, the second guideway having second guideway ends, the overhanging first guideway ends of the spaced first pieces being shaped to receive the second guideway ends inserted from above, thereby allowing the second guideway to be lowered into place between the spaced first pieces to assemble the guideway support system.

* * * * *

UNITED STATES PATENT AND TRADEMARK OFFICE
CERTIFICATE OF CORRECTION

PATENT NO. : 6,571,717 B2
DATED : June 3, 2003
INVENTOR(S) : Einar Svensson

It is certified that error appears in the above-identified patent and that said Letters Patent is hereby corrected as shown below:

Column 3,
Line 37, "90'" should read -- 90º --.

Column 5,
Line 64, "may secured" should read -- may be secured --.

Column 6,
Line 9, "material. such" should read -- material, such --.

Column 7,
Line 12, "foundation materials" should read -- foundation material --.

Column 12,
Line 47, "thereby for" should read -- thereby form --.

Signed and Sealed this

Eighteenth Day of November, 2003

JAMES E. ROGAN
*Director of the United States Patent and Trademark Office*